United States Patent
Yoshida et al.

(10) Patent No.: US 10,915,427 B2
(45) Date of Patent: Feb. 9, 2021

(54) EQUIVALENCE VERIFICATION APPARATUS AND COMPUTER READABLE MEDIUM

(71) Applicant: MITSUBISHI ELECTRIC CORPORATION, Tokyo (JP)

(72) Inventors: Mikiya Yoshida, Tokyo (JP); Makoto Isoda, Tokyo (JP); Kazuki Yonemochi, Tokyo (JP); Masuo Ito, Tokyo (JP); Madoka Baba, Tokyo (JP); Reiya Noguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/475,865

(22) PCT Filed: Feb. 22, 2017

(86) PCT No.: PCT/JP2017/006598
§ 371 (c)(1),
(2) Date: Jul. 3, 2019

(87) PCT Pub. No.: WO2018/154657
PCT Pub. Date: Aug. 30, 2018

(65) Prior Publication Data
US 2019/0370151 A1 Dec. 5, 2019

(51) Int. Cl.
*G06F 11/36* (2006.01)
*G06F 8/72* (2018.01)

(52) U.S. Cl.
CPC ...... *G06F 11/3648* (2013.01); *G06F 11/3624* (2013.01); *G06F 8/72* (2013.01)

(58) Field of Classification Search
None
See application file for complete search history.

(56) References Cited

U.S. PATENT DOCUMENTS

| 2006/0041873 A1* | 2/2006 | Pandarinathan | G06F 8/71 717/141 |
| 2010/0269105 A1* | 10/2010 | Arnold | G06F 8/71 717/153 |

(Continued)

FOREIGN PATENT DOCUMENTS

| JP | 2010-204954 A | 9/2010 |
| JP | 2011-232814 A | 11/2011 |

(Continued)

OTHER PUBLICATIONS

Rungta et al., "A Change Impact Analysis to Characterize Evolving Program Behaviors"; 28th IEEE International Conference on Software Maintenance, 2012. pp. 109-118.

(Continued)

*Primary Examiner* — Philip Wang
(74) *Attorney, Agent, or Firm* — Birch, Stewart, Kolasch & Birch, LLP

(57) ABSTRACT

An equivalence verification unit (130) judges through equivalence verification, for each of corresponding combinations which are each a combination of a function included in pre-change source code and a function included in post-change source code, whether the functions included in the corresponding combination are equivalent to each other. A partial verification judgment unit (150) judges, for each of inequivalent ones of the corresponding combinations, whether the corresponding combination is a partial verification combination including a function where an inequivalent path, in which an inequivalent function is called, and a non-inequivalent path, in which a non-inequivalent function is called, are both included. A partial verification unit (160) judges, for each of the partial verification combinations, whether the functions included in the partial verification combination are partially equivalent to each other by exclud- (Continued)

ing the inequivalent path and performing the equivalence verification.

9 Claims, 36 Drawing Sheets

(56) References Cited

U.S. PATENT DOCUMENTS

| | | | |
|---|---|---|---|
| 2011/0138362 A1* | 6/2011 | Keidar-Barner | G06F 9/44589 717/126 |
| 2015/0067653 A1* | 3/2015 | Guarnieri | G06F 8/30 717/126 |
| 2016/0179653 A1* | 6/2016 | Suzuki | G06F 8/72 717/126 |
| 2020/0034280 A1* | 1/2020 | Yonemochi | G06F 11/3688 |

FOREIGN PATENT DOCUMENTS

| | | |
|---|---|---|
| JP | 2011-248561 A | 12/2011 |
| JP | 2016-31622 A | 3/2016 |

OTHER PUBLICATIONS

Yang et al., "Directed Incremental Symbolic Execution", ACM Transactions on Software Engineering and Methology, vol. 24, No. 1, Article 3, Sep. 2014, 42 pages.
International Search Report, issued in PCT/JP2017/006598, dated Apr. 18, 2017.
Majumdar et al., "Compositional Equivalence Checking for Models and Code of Control Systems", 52nd IEEE Conference on Decision and Control, Dec. 10-13, 2013, Florence, Italy, pp. 1564-1571.
Communication pursuant to Article 94(3) EPC dated Oct. 6, 2020 in corresponding European Application No. 17897365.7.

* cited by examiner

Fig. 3

210:PRE-CHANGE SOURCE CODE

```
void Func_F_x(…) {
        :
}
void Func_E_x(…) {
        :
}
void Func_D_x(…) {
        :
}
void Func_C_x(…) {
        :
        …= Func_F_x(…)
        return…;
}
void Func_B_x(int m_x) {
    int n_x;
    if(m_x > 0) {
       n_x = Func_D_x(…);
    }else{
       n_x = Func_E_x(…);
    }return n_x;
}
void Func_A_x(int q_x) {
    int r_x;
    if(q_x > 0) {
       r_x = Func_B_x(…),
    }else{
       r_x = Func_C_x(…),
    }return r_x;
}
```

Fig. 4

220:POST-CHANGE SOURCE CODE

```
void Func_E_y(…) {
        :
}
void Func_D_y(…) {
        :
}
void Func_C_y(…) {
        :
        :
        :
    return…;
}
void Func_B_y(int m_y) {
    int n_y;
    if(m_y > 0) {
        n_y = Func_D_y(…);
    }else{
        n_y = Func_E_y(…);
    } return n_y;
}
void Func_A_y(int q_y) {
    int r_y;
    if(q_y > 0) {
        r_y = Func_B_y(…);
    }else{
        r_y = Func_C_y(…);
    } return r_y;
}
```

Fig. 5

231:PRE-CHANGE CALL GRAPH

```
digraph callgraph{
    "Func_A_x"  ->  "Func_B_x"   [style=solid];
    "Func_A_x"  ->  "Func_C_x"   [style=solid];
    "Func_B_x"  ->  "Func_D_x"   [style=solid];
    "Func_B_x"  ->  "Func_E_x"   [style=solid];
    "Func_C_x"  ->  "Func_F_x"   [style=solid];
}
```

Fig. 6

232:POST-CHANGE CALL GRAPH

```
digraph callgraph{
    "Func_A_y"  ->  "Func_B_y"   [style=solid] ;
    "Func_A_y"  ->  "Func_C_y"   [style=solid] ;
    "Func_B_y"  ->  "Func_D_y"   [style=solid] ;
    "Func_B_y"  ->  "Func_E_y"   [style=solid] ;
}
```

233:FUNCTION CORRESPONDENCE TABLE

| No. | PRE-CHANGE FUNCTION | POST-CHANGE FUNCTION |
|---|---|---|
| 1 | Func_F_x | – |
| 2 | Func_E_x | Func_E_y |
| 3 | Func_D_x | Func_D_y |
| 4 | Func_C_x | Func_C_y |
| 5 | Func_B_x | Func_B_y |
| 6 | Func_A_x | Func_A_y |

240:EQUIVALENCE JUDGMENT TABLE

| TARGET FUNCTION | COUNTER-EXAMPLE | DEGREE OF EQUIVALENCE | PRE-CHANGE SOURCE CODE | POST-CHANGE SOURCE CODE |
|---|---|---|---|---|
| Func_F | | INEQUIVALENCE | | |

Fig.10

250:VERIFICATION FILE

```
void check_Func_B(int input_x, int input_y) {
    int output_x, output_y;

//INPUT COINCIDENCE CONDITION                          — 251
    __CPROVER_assume(input_x == input_y);

//FUNCTION TO BE VERIFIED BEFORE
       SOURCE CODE CHANGE                                  — 252
    output_x = Func_B_x(input_x);

// FUNCTION TO BE VERIFIED AFTER
       SOURCE CODE CHANGE                                  — 253
    output_y = Func_B_y(input_y);

// OUTPUT COINCIDENCE CONDITION                        — 254
    assert(output_x == output_y);
}
```

240:EQUIVALENCE JUDGMENT TABLE

| TARGET FUNCTION | COUNTER-EXAMPLE | DEGREE OF EQUIVALENCE | PRE-CHANGE SOURCE CODE | POST-CHANGE SOURCE CODE |
|---|---|---|---|---|
| Func_F | | INEQUIVALENCE | | |
| Func_E | ... | INEQUIVALENCE | - | - |
| Func_D | - | EQUIVALENCE | - | - |
| Func_C | ... | INEQUIVALENCE | - | - |

240:EQUIVALENCE JUDGMENT TABLE

| TARGET FUNCTION | COUNTER-EXAMPLE | DEGREE OF EQUIVALENCE | PRE-CHANGE SOURCE CODE | POST-CHANGE SOURCE CODE |
|---|---|---|---|---|
| Func_F | / | INEQUIVALENCE | / | / |
| Func_E | ... | INEQUIVALENCE | – | – |
| Func_D | – | EQUIVALENCE | – | – |
| Func_C | ... | INEQUIVALENCE | – | – |
| Func_B | 0 | | | |

Fig.13

210: PRE-CHANGE SOURCE CODE

```
void Func_F_x(…) {
    count1_x++;        ← 211
        :
}
void Func_E_x(…) {
    count2_x++;        ← 212
        :
}
void Func_D_x(…) {
    count3_x++;        ← 213
        :
}
void Func_C_x(…) {
    count4_x++;        ← 214
        :
    … = Func_F_x(…)
    return…;
}
void Func_B_x(int m_x) {
    int n_x;
    if (m_x > 0) {
        n_x = Func_D_x(…);
    } else {
        n_x = Func_E_x(…);
    } return n_x;
}
void Func_A_x(int q_x) {
    int r_x;
    if (q_x > 0) {
        r_x = Func_B_x(…);
    } else {
        r_x = Func_C_x(…);
    } return r_x;
}
```

Fig.14

210: PRE-CHANGE SOURCE CODE

```
void Func_F_x (…) {
    count1_x++;
        :
}
void Func_E_x (…) {
    count2_x++;
        :
}
void Func_D_x (…) {
    count3_x++;
        :
}
void Func_C_x (…) {
    count4_x++;
        :
    …= Func_F_x (…)
    return…;
}
void Func_B_x (int m_x) {
    int n_x;
    count5_x++;
    if (m_x > 0) {
        count6_x++;
        n_x = Func_D_x (…);
    } else {
        count7_x++;
        n_x = Func_E_x (…);
    } return n_x;
}
void Func_A_x (int q_x) {
    int r_x;
    if (q_x > 0) {
        r_x = Func_B_x (…);
    } else {
        r_x = Func_C_x (…);
    } return r_x;
}
```

211 → count1_x++;
212 → count2_x++;
213 → count3_x++;
214 → count4_x++;
215 → count5_x++;
216 → count6_x++;
217 → count7_x++;

Fig.15

220:POST-CHANGE SOURCE CODE

```
void Func_E_y(…) {
    count1_y++;
         ⋮
}
void Func_D_y(…) {
    count2_y++;
         ⋮
}
void Func_C_y(…) {
    count3_y++;
         ⋮
         ⋮
         return…;
}
void Func_B_y(int m_y) {
    int n_y;
    if(m_y > 0) {
        n_y = Func_D_y(…);
    } else {
        n_y = Func_E_y(…);
    } return n_y;
}
void Func_A_y(int q_y) {
    int r_y;
    if(q_y > 0) {
        r_y = Func_B_y(…);
    } else {
        r_y = Func_C_y(…);
    } return r_y;
}
```

221 → count1_y++;
222 → count2_y++;
223 → count3_y++;

Fig.16

220: POST-CHANGE SOURCE CODE

```
void Func_E_y(…) {
    count1_y++;
        ⋮
}
void Func_D_y(…) {
    count2_y++;
        ⋮
}
void Func_C_y(…) {
    count3_y++;
        ⋮
        ⋮
        return…;
}
void Func_B_y(int m_y) {
    int n_y;
    count4_y++;
    if(m_y > 0) {
        count5_y++;
        n_y = Func_D_y(…);
    } else {
        count6_y++;
        n_y = Func_E_y(…);
    } return n_y;
}
void Func_A_y(int q_y) {
    int r_y;
    if(q_y > 0) {
        r_y = Func_B_y(…);
    } else {
        r_y = Func_C_y(…);
    } return r_y;
}
```

221 → count1_y++;
222 → count2_y++;
223 → count3_y++;
224 → count4_y++;
225 → count5_y++;
226 → count6_y++;

Fig.17

260:IDENTIFIER CORRESPONDENCE TABLE

| No. | TARGET FUNCTION | PRE-CHANGE SOURCE CODE | | POST-CHANGE SOURCE CODE | |
|---|---|---|---|---|---|
| | | BRANCHING POINT IDENTIFIER | CALLEE FUNCTION | BRANCHING POINT IDENTIFIER | CALLEE FUNCTION |
| 1 | Func_F | count4_x | – | | |
| 2 | Func_E | | – | | – |
| 3 | Func_D | | – | | – |
| 4 | Func_C | | Func_F_x | | – |

Fig.18

260: IDENTIFIER CORRESPONDENCE TABLE

| No. | TARGET FUNCTION | PRE-CHANGE SOURCE CODE | | POST-CHANGE SOURCE CODE | |
|---|---|---|---|---|---|
| | | BRANCHING POINT IDENTIFIER | CALLEE FUNCTION | BRANCHING POINT IDENTIFIER | CALLEE FUNCTION |
| 1 | Func_F | count4_x | – | | |
| 2 | Func_E | count7_x | – | count6_y | – |
| 3 | Func_D | count6_x | – | count5_y | – |
| 4 | Func_C | | Func_F_x | | – |
| 5 | Func_B | | Func_D_x<br>Func_E_x | | Fucn_D_y<br>Func_E_y |

Fig. 22

250: VERIFICATION FILE

```
void check_Func_B(int input_x, int input_y) {
    int output_x, output_y;

//INPUT COINCIDENCE CONDITION
    __CPROVER_assume(input_x == input_y);                — 251

//FUNCTION TO BE VERIFIED BEFORE
        SOURCE CODE CHANGE
    output_x = Func_B_x(input_x);                         — 252

// EQUIVALENCE JUDGMENT RANGE CONSTRAINT
    __CPROVER_assume(count7_x == 0);                      — 255

// FUNCTION TO BE VERIFIED AFTER
        SOURCE CODE CHANGE
    output_y = Func_B_y(input_y);                         — 253

// EQUIVALENCE JUDGMENT RANGE CONSTRAINT
    __CPROVER_assume(count6_y == 0);                      — 256

// OUTPUT COINCIDENCE CONDITION
    assert(output_x == output_y);                         — 254
}
```

Fig. 24

```
void Func_F_x(…) {
    count1_x++;
    ⋮
}
void Func_E_x(…) {
    count2_x++;
    ⋮
}
void Func_D_x(…) {
    count3_x++;
    ⋮
}
void Func_C_x(…) {
    count4_x++;
    ⋮
    … = Func_F_x(…)
    return…;
}
void Func_B_x(int m_x) {
    int n_x;
    count5_x++;
    if(m_x > 0) {
        count6_x++;
        n_x = Func_D_x(…);
    }else{
        count7_x++;
        n_x = Func_E_x(…);
    } return n_x;
}
void Func_A_x(int q_x) {
    int r_x;
    count8_x++;
    if(q_x > 0) {
        count9_x++;
        r_x = Func_B_x(…);
    }else{
        count10_x++;
        r_x = Func_C_x(…);
    } return r_x;
}
```

- 211 → count1_x++;
- 212 → count2_x++;
- 213 → count3_x++;
- 214 → count4_x++;
- 215 → count5_x++;
- 216 → count6_x++;
- 217 → count7_x++;
- 218 → count8_x++;
- 219 → count9_x++;
- 2110 → count10_x++;

210: PRE-CHANGE SOURCE CODE

Fig.25

220:POST-CHANGE SOURCE CODE

```
void Func_E_y(…) {
221 →   count1_y++;
          ⋮
}
void Func_D_y(…) {
222 →   count2_y++;
          ⋮
}
void Func_C_y(…) {
223 →   count3_y++;
          ⋮
          ⋮
          return…;
}
void Func_B_y(int m_y) {
    int n_y;
224 →   count4_y++;
    if(m_y > 0) {
225 →       count5_y++;
        n_y = Func_D_y(…);
    } else {
226 →       count6_y++;
        n_y = Func_E_y(…);
    } return n_y;
}
void Func_A_y(int q_y) {
    int r_y;
227 →   count7_y++;
    if(q_y > 0) {
228 →       count8_y++;
        r_y = Func_B_y(…);
    } else {
229 →       count9_y++;
        r_y = Func_C_y(…);
    } return r_y;
}
```

Fig. 26

260: IDENTIFIER CORRESPONDENCE TABLE

| No. | TARGET FUNCTION | PRE-CHANGE SOURCE CODE | | POST-CHANGE SOURCE CODE | |
|---|---|---|---|---|---|
| | | BRANCHING POINT IDENTIFIER | CALLEE FUNCTION | BRANCHING POINT IDENTIFIER | CALLEE FUNCTION |
| 1 | Func_F | count4_x | - | | |
| 2 | Func_E | count7_x | - | count6_y | - |
| 3 | Func_D | count6_x | - | count5_y | - |
| 4 | Func_C | count10_x | Func_F_x | count9_y | - |
| 5 | Func_B | count9_x | Func_D_x Func_E_x | count8_y | Fucn_D_y Func_E_y |
| 6 | Func_A | | Func_B_x Func_C_x | | Func_B_y Func_C_y |

Fig. 27

250:VERIFICATION FILE

```
void check_Func_A(int input_x, int input_y) {
    int output_x, output_y;

//INPUT COINCIDENCE CONDITION                                    — 251
    __CPROVER_assume(input_x == input_y);

//FUNCTION TO BE VERIFIED BEFORE                                 — 252
      SOURCE CODE CHANGE
    output_x = Func_A_x(input_x);

// EQUIVALENCE JUDGMENT RANGE CONSTRAINT         — 255
    __CPROVER_assume(count10_x == 0);

// FUNCTION TO BE VERIFIED AFTER                                 — 253
      SOURCE CODE CHANGE
    output_y = Func_A_y(input_y);

// EQUIVALENCE JUDGMENT RANGE CONSTRAINT         — 256
    __CPROVER_assume(count9_y == 0);

//OUTPUT COINCIDENCE CONDITION                                   — 254
    assert(output_x == output_y);
}
```

Fig. 28

250: VERIFICATION FILE

```
void check_Func_A(int input_x, int input_y) {
    int output_x, output_y;

//INPUT COINCIDENCE CONDITION
    __CPROVER_assume(input_x == input_y);                    — 251

//FUNCTION TO BE VERIFIED BEFORE
      SOURCE CODE CHANGE                                     — 252
    output_x = Func_A_x(input_x);

// EQUIVALENCE JUDGMENT RANGE CONSTRAINT   — 255
    __CPROVER_assume(count10_x == 0);

__CPROVER_assume(count7_x == 0);          — 257

//FUNCTION TO BE VERIFIED AFTER SOURCE
      CODE CHANGE                                            — 253
    output_y = Func_A_y(input_y);

//EQUIVALENCE JUDGMENT RANGE CONSTRAINT    — 256
    __CPROVER_assume(count9_y == 0);

__CPROVER_assume(count6_y == 0);          — 258

//OUTPUT COINCIDENCE CONDITION
    assert(output_x == output_y);                            — 254
}
```

240:EQUIVALENCE JUDGMENT TABLE

| TARGET FUNCTION | COUNTER-EXAMPLE | DEGREE OF EQUIVALENCE | PRE-CHANGE SOURCE CODE | POST-CHANGE SOURCE CODE |
|---|---|---|---|---|
| Func_F |  | INEQUIVALENCE |  |  |
| Func_E | ... | INEQUIVALENCE | − | − |
| Func_D | − | EQUIVALENCE | − | − |
| Func_C | ... | INEQUIVALENCE | − | − |
| Func_B | 0 | PARTIAL EQUIVALENCE | count7_x | count6_y |
| Func_A | 0 | PARTIAL EQUIVALENCE | count7_x count10_x | count6_y count9_y |

270: CALL GRAPH CHART

Fig. 34

280:PATH JUDGMENT TABLE

| No. | CALL PATH | BRANCHING POINT IDENTIFIER | DEGREE OF EQUIVALENCE |
|---|---|---|---|
| 1 | Func_A_y → Func_B_y → Func_D_y | count8_y count5_y | |
| 2 | Func_A_y → Func_B_y → Func_E_y | count8_y count6_y | |
| 3 | Func_A_y → Func_C_y | count9_y | |

280: PATH JUDGMENT TABLE

| No. | CALL PATH | BRANCHING POINT IDENTIFIER | DEGREE OF EQUIVALENCE |
|---|---|---|---|
| 1 | Func_A_y → Func_B_y → Func_D_y | count8_y count5_y | EQUIVALENCE |
| 2 | Func_A_y → Func_B_y → Func_E_y | count8_y count6_y | INEQUIVALENCE |
| 3 | Func_A_y → Func_C_y | count9_y | INEQUIVALENCE |

EQUIVALENCE VERIFICATION APPARATUS AND COMPUTER READABLE MEDIUM

TECHNICAL FIELD

The present invention relates to a technique for verifying the equivalence of functions.

BACKGROUND ART

With software multifunctionalization and computerization, software has been steadily increasing in complexity and scale. Under the circumstances, it is necessary to achieve increase in the productivity of software development.

For example, a software development tool which implements quality maintenance and reduction in development man-hours is applied to software differential and derivative development.

There is available an approach called refactoring in software differential and derivative development. Refactoring is an approach for improving the quality of software by changing the internal configuration of the software without changing the substance of logical operations in the software.

Refactoring involves a change of source code. Thus, a change of source code may cause a bug, and the substance of logical operations may be unintentionally changed.

For this reason, verification of software before change and software after change is required for software differential and derivative development.

Non-Patent Literature 1 discloses an approach regarding equivalence verification for source code which is generated using legacy code and Simulink.

The term "equivalent" means that two pieces of source code coincide in the substance of logical operations, that is, that the same output values are obtained for the same input value.

The term "equivalence verification" means verifying whether two pieces of source code are equivalent.

In Non-Patent Literature 1, a call graph is generated for each of two pieces of source code in order to represent a call relationship among functions included in the piece of source code. The call graphs are used to associate functions coincident in function name and call relationship with each other and perform equivalence verification on a function-by-function basis.

Equivalence verification is performed in order from a function at an extremity. The requirement for equivalence is that the same output values are obtained from two pieces of source code if the two pieces of source code are executed with the same input value. The equivalence verification exhaustively analyzes, for every input value, whether two pieces of source code are coincident in an output value for the input value and judges equivalence on a function-by-function basis.

In Patent Literature 1, a tag representing behavior is embedded in a block as a branch destination for a branching statement in source code. Behavior as a verification object is designated, and a value range for a variable (or an expression) for passage through a block to be verified is specified on the basis of a tag embedded in the block and the designated behavior. Only source code related to the specific behavior can be verified by setting the specified value range as a verification range.

CITATION LIST

Patent Literature

Patent Literature 1: JP 2010-204954

Non-Patent Literature

Non-Patent Literature 1: Rupak Majumdar et al., "Compositional Equivalence Checking for Models and Code of Control Systems", 52nd IEEE Conference on Decision and Control, December 2013.

SUMMARY OF INVENTION

Technical Problem

Non-Patent Literature 1 requires that output values for an input value coincide in the case of every input value. For this reason, even if the degree of equivalence between functions varies depending on paths to pass through in the functions, the functions are judged as inequivalent. Thus, a range for analysis of the reason why the functions are judged as inequivalent is wide, and the time required for manual bug analysis cannot be reduced.

For example, the equivalence between a function $A_X$ and a function $A_Y$ is judged. If a specific condition is satisfied, a function $B_X$ is called in the function $A_X$, and a function $B_Y$ equivalent to the function $B_X$ is called in the function $A_Y$. Thus, the function $A_X$ and the function $A_Y$ are equivalent if the specific condition is satisfied. If the specific condition is not satisfied, a function $C_X$ is called in the function $A_X$, and the function $B_Y$ not equivalent to the function $C_X$ is called in the function $A_Y$. Thus, the function $A_X$ and the function $A_Y$ are inequivalent if the specific condition is not satisfied.

In Non-Patent Literature 1, functions are judged as inequivalent if the functions are equivalent in a state where a specific condition is satisfied and are not equivalent in a state where the specific condition is not satisfied. Thus, the function $A_X$ and the function $A_Y$ are judged as inequivalent.

According to Patent Literature 1, if there are a large number of variables or an expression is complicated, a value range for passage through a specific block may not be uniquely determined. For this reason, the range of application of Patent Literature 1 is limited.

The present invention has as its object to allow judgment as to whether functions are partially equivalent to each other.

Solution to Problem

An equivalence verification apparatus according to the present invention includes:

an equivalence verification unit to judge through equivalence verification, for each of corresponding combinations which are each a combination of a function included in pre-change source code and a function included in post-change source code, whether the functions included in the corresponding combination are equivalent to each other;

a partial verification judgment unit to judge, for each of inequivalent ones of the corresponding combinations, whether the corresponding combination is a partial verification combination including a function where an inequivalent path, in which an inequivalent function is called, and a non-inequivalent path, in which a non-inequivalent function is called, are both included; and a partial verification unit to judge, for each of the partial verification combinations, whether the functions included in the partial verification combination are partially equivalent to each other by excluding the inequivalent path and performing the equivalence verification.

Advantageous Effects of Invention

According to the present invention, it is possible to judge whether functions are partially equivalent to each other.

BRIEF DESCRIPTION OF DRAWINGS

FIG. 3 is a view illustrating pre-change source code 210 according to Embodiment 1.

FIG. 4 is a view illustrating post-change source code 220 according to Embodiment 1.

FIG. 5 is a view illustrating a pre-change call graph 231 according to Embodiment 1.

FIG. 6 is a view illustrating a post-change call graph 232 according to Embodiment 1.

FIG. 10 is a view illustrating a verification file 250 according to Embodiment 1.

FIG. 13 is a view illustrating the pre-change source code 210 (before step S143) according to Embodiment 1.

FIG. 14 is a view illustrating the pre-change source code 210 (after step S143) according to Embodiment 1.

FIG. 15 is a view illustrating the post-change source code 220 (before step S143) according to Embodiment 1.

FIG. 16 is a view illustrating the post-change source code 220 (after step S143) according to Embodiment 1.

FIG. 17 is a chart illustrating an identifier correspondence table 260 (before step S144) according to Embodiment 1.

FIG. 18 is a chart illustrating the identifier correspondence table 260 (after step S144) according to Embodiment 1.

FIG. 22 is a view illustrating the verification file 250 (after step S221) according to Embodiment 1.

FIG. 24 is a view illustrating the pre-change source code 210 (after step S143) according to Embodiment 1.

FIG. 25 is a view illustrating the post-change source code 220 (after step S143) according to Embodiment 1.

FIG. 26 is a chart illustrating the identifier correspondence table 260 (after step S144) according to Embodiment 1.

FIG. 27 is a view illustrating the verification file 250 (after step S221) according to Embodiment 1.

FIG. 28 is a view illustrating the verification file 250 (after step S223) according to Embodiment 1.

FIG. 34 is a chart illustrating a path judgment table 280 (after step S310) according to Embodiment 2.

DESCRIPTION OF EMBODIMENTS

Figure 1:
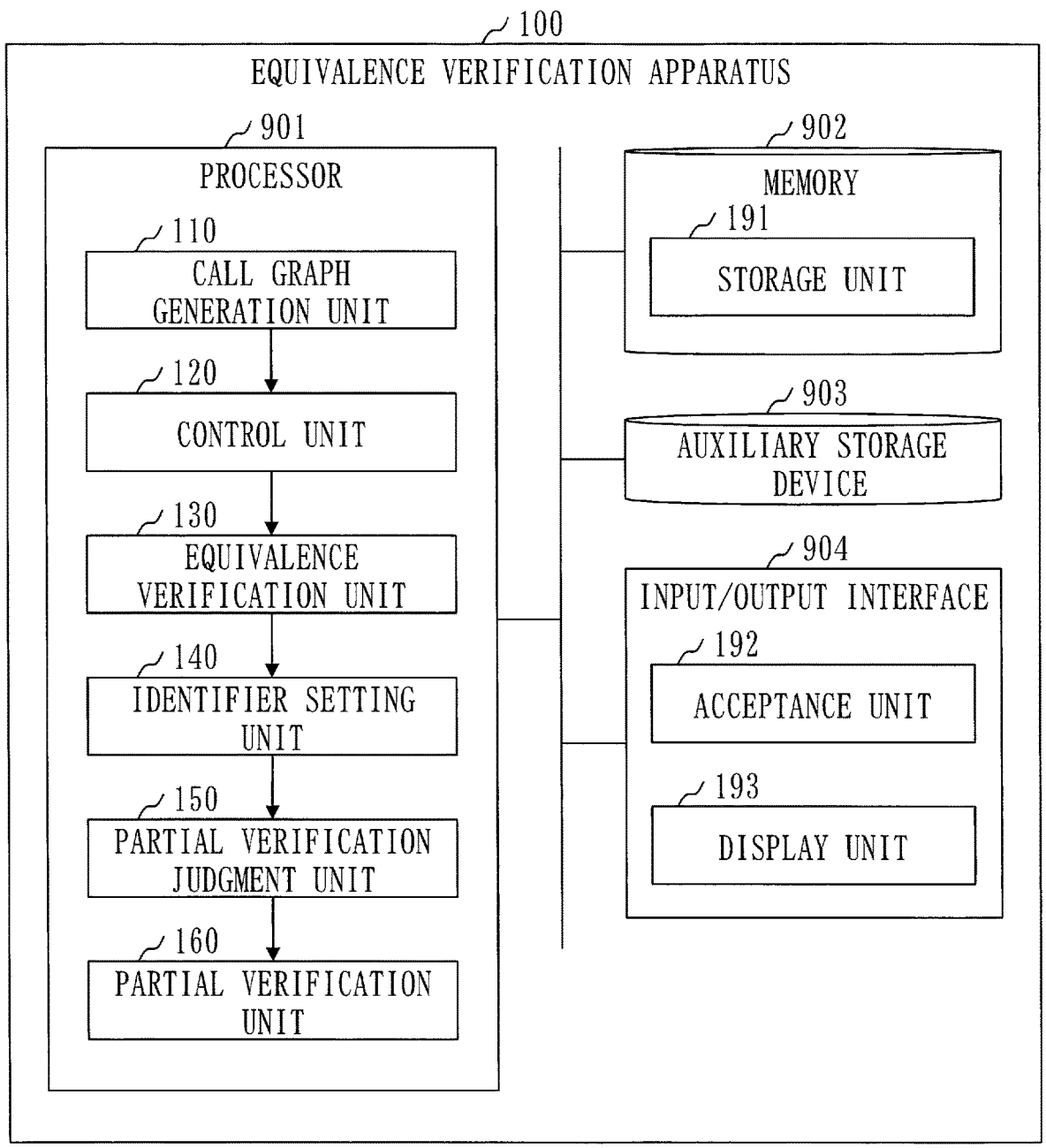
FIG. 1 is a configuration diagram of an equivalence verification apparatus 100 according to Embodiment 1.

Throughout the embodiments and drawings, the same elements and corresponding elements are denoted by the same reference numerals. A description of an element denoted by the same reference numeral will be appropriately omitted or simplified. An arrow in the drawings mainly indicates the flow of data or the flow of processing.

Embodiment 1

A form for judging whether functions are partially equivalent to each other will be described with reference to FIGS. 1 to 29.

*Description of Configuration*

A configuration of an equivalence verification apparatus 100 will be described with reference to FIG. 1.

The equivalence verification apparatus 100 is a computer which includes pieces of hardware, such as a processor 901, a memory 902, an auxiliary storage device 903, and an input/output interface 904. The pieces of hardware are connected to one another via signal lines.

The processor 901 is an integrated circuit (IC) which performs arithmetic processing and controls the other pieces of hardware. For example, the processor 901 is a central processing unit (CPU), a digital signal processor (DSP), or a graphics processing unit (GPU).

The memory 902 is a volatile storage device. The memory 902 is called a main storage device or a main memory. For example, the memory 902 is a random access memory (RAM). Data stored in the memory 902 is saved in the auxiliary storage device 903 as needed.

The auxiliary storage device 903 is a non-volatile storage device. For example, the auxiliary storage device 903 is a read only memory (ROM), an hard disk drive (HDD), or a flash memory. Data stored in the auxiliary storage device 903 is loaded into the memory 902 as needed.

The input/output interface 904 is a port, to which an input device and an output device are connected. For example, the input/output interface 904 is a USB terminal, input devices are a keyboard and a mouse, and an output device is a display. USB stands for Universal Serial Bus.

The equivalence verification apparatus 100 includes software elements, such as a call graph generation unit 110, a control unit 120, an equivalence verification unit 130, an identifier setting unit 140, a partial verification judgment unit 150, and a partial verification unit 160. A software element is an element which is implemented by software.

An equivalence verification program for causing a computer to function as the call graph generation unit 110, the control unit 120, the equivalence verification unit 130, the identifier setting unit 140, the partial verification judgment unit 150, and the partial verification unit 160 is stored in the auxiliary storage device 903. The equivalence verification program is loaded into the memory 902 and is executed by the processor 901.

Additionally, an operating system (OS) is stored in the auxiliary storage device 903. At least a part of the OS is loaded into the memory 902 and is executed by the processor 901.

That is, the processor 901 executes the equivalence verification program while executing the OS.

Data which is obtained through execution of the equivalence verification program is stored in a storage device, such as the memory 902, the auxiliary storage device 903, a register in the processor 901, or a cache memory in the processor 901.

The memory 902 functions as a storage unit 191 which stores data. Note that any other storage device may function as the storage unit 191 instead of or together with the memory 902.

The input/output interface 904 functions as an acceptance unit 192 which accepts input. The input/output interface 904 also functions as a display unit 193 which displays an image and the like.

The equivalence verification apparatus 100 may include a plurality of processors which replace the processor 901. The plurality of processors share roles of the processor 901.

The equivalence verification program can be computer-readably stored in a non-volatile storage medium, such as a magnetic disc, an optical disc, or a flash memory. The non-volatile storage medium is a non-transitory tangible medium.

*Description of Operation*

Operation of the equivalence verification apparatus 100 corresponds to an equivalence verification method. A procedure for the equivalence verification method corresponds to a procedure for the equivalence verification program.

Figure 2:
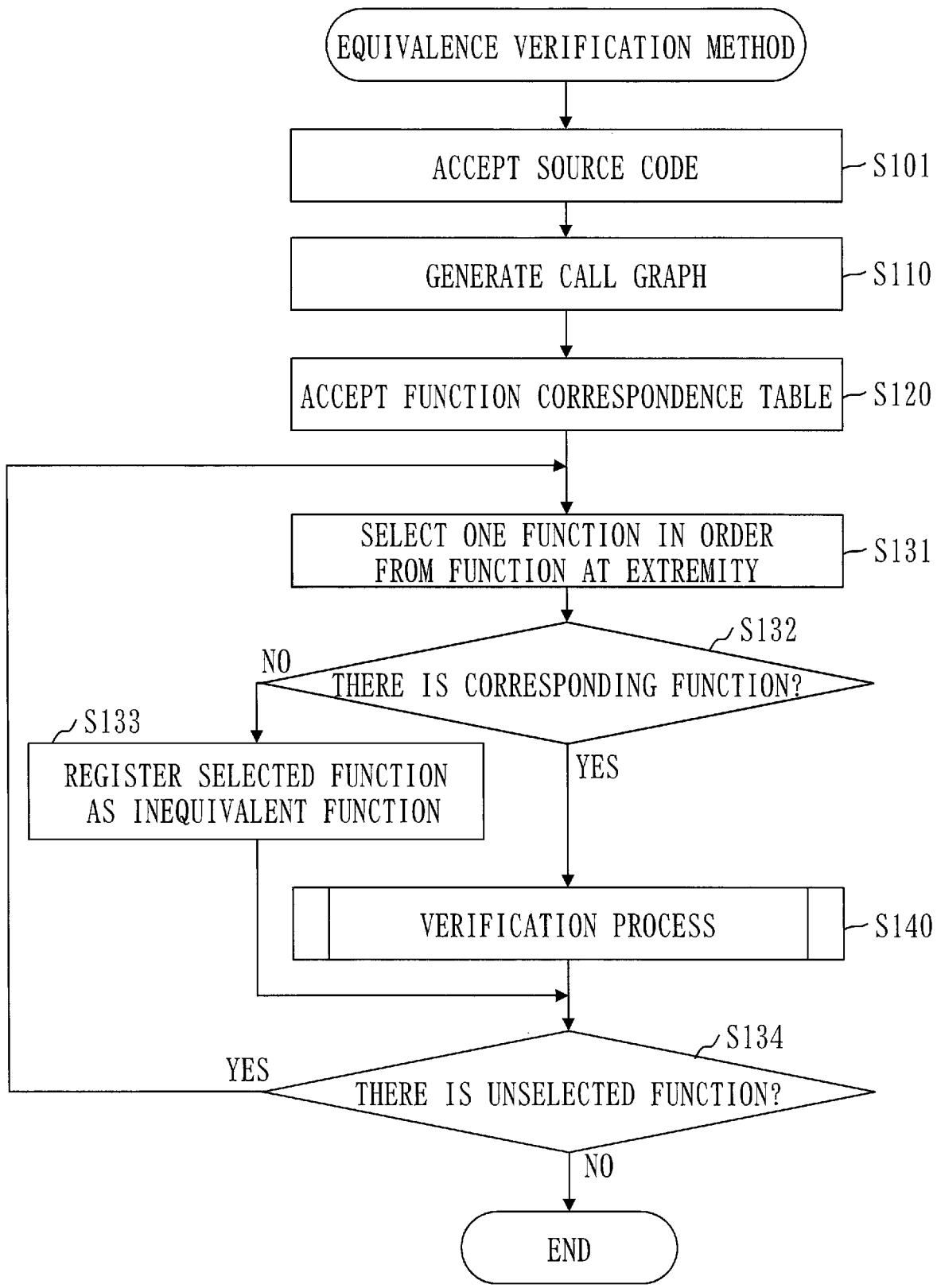
FIG. 2 is a flowchart of an equivalence verification method according to Embodiment 1.

The equivalence verification method will be described with reference to FIG. 2.

In step S101, the acceptance unit 192 accepts pre-change source code and post-change source code. The storage unit 191 stores the accepted pre-change source code and post-change source code.

The pre-change source code is source code in pre-change software. For example, the pre-change source code is source code which is conventionally created.

The post-change source code is source code in post-change software. For example, the post-change source code is source code which is obtained by carrying out refactoring on the basis of the pre-change source code.

FIG. 3 illustrates pre-change source code 210. The pre-change source code 210 is a concrete example of the pre-change source code.

The pre-change source code 210 includes six functions (Func_F_x, Func_E_x, Func_D_x, Func_C_x, Func_B_x, and Func_A_x).

FIG. 4 illustrates post-change source code 220. The post-change source code 220 is a concrete example of the post-change source code.

The post-change source code 220 includes five functions (Func_E_y, Func_D_y, Func_C_y, Func_B_y, and Func_A_y).

Colons and ellipses in the pre-change source code 210 and the post-change source code 220 each indicate an omission of a description.

Referring back to FIG. 2, the description will be continued from step S110.

In step S110, the call graph generation unit 110 generates a pre-change call graph and a post-change call graph by analyzing the pre-change source code and the post-change source code. The storage unit 191 stores the pre-change call graph and the post-change call graph.

The pre-change call graph is a call graph for the pre-change source code.

The post-change call graph is a call graph for the post-change source code.

A call graph is data indicating a call relationship among functions and can be generated by a conventional technique.

For example, the call graph generation unit 110 generates the pre-change call graph by receiving, as input, the pre-change source code and executing egypt. The call graph generation unit 110 also generates the post-change call graph by receiving, as input, the post-change source code and executing egypt. Egypt is an existing tool for generating a call graph.

FIG. 5 illustrates a pre-change call graph 231. The pre-change call graph 231 is a pre-change call graph which is obtained by receiving, as input, the pre-change source code 210 in FIG. 3 and executing egypt.

The pre-change call graph 231 indicates that Func_B_x and Func_C_x are called by Func_A_x, that Func_D_x and Func_E_x are called by Func_B_x, and that Func_F_x is called by Func_C_x.

FIG. 6 illustrates a post-change call graph 232. The post-change call graph 232 is a post-change call graph which is obtained by receiving, as input, the post-change source code 220 in FIG. 4 and executing egypt.

The post-change call graph 232 indicates that Func_B_y and Func_C_y are called by Func_A_y and that Func_D_y and Func_E_y are called by Func_B_y.

Referring back to FIG. 2, the description will be continued from step S120.

In step S120, the acceptance unit 192 accepts a function correspondence table. The storage unit 191 stores the accepted function correspondence table.

The function correspondence table is data indicating a correspondence relationship between pre-change functions and post-change functions.

A pre-change function is a function included in the pre-change source code.

A post-change function is a function included in the post-change source code.

The function correspondence table, in particular, indicates correspondence relationships between pre-change functions and post-change functions in a reverse call order for the pre-change functions or the post-change functions.

The reverse call order is the opposite of a call order.

The call order is an order from a superordinate to a subordinate in a call relationship. A superordinate in a call relationship is a function as a caller, and a subordinate in the call relationship is a function as a callee.

A function at the bottom of the call order, that is, a function at the top of the reverse call order is referred to as a function at an extremity.

For example, the function correspondence table is accepted by the procedure below.

The display unit 193 first displays the pre-change call graph on the display.

A verifier refers to the pre-change call graph and judges the reverse call order for the pre-change functions.

The verifier then refers to a pre-change specification and a post-change specification and judges a post-change function corresponding to each pre-change function in the reverse call order for the pre-change functions.

The verifier then manipulates the input devices to input the function correspondence table to the equivalence verification apparatus 100.

The acceptance unit 192 accepts the input function correspondence table.

Figure 7:
FIG. 7 is a chart illustrating a function correspondence table 233 according to Embodiment 1.

FIG. 7 illustrates a function correspondence table 233. The function correspondence table 233 is a function correspondence table corresponding to the pre-change source code 210 in FIG. 3 and the post-change source code 220 in FIG. 4.

The function correspondence table 233 associates functions included in the pre-change source code 210 and functions included in the post-change source code 220 with each other.

A column for pre-change function shows the names of the functions included in the pre-change source code 210 while a column for post-change function shows the names of the functions included in the post-change source code 220. A hyphen indicates absence of a corresponding function.

In the column for pre-change function, the names of the functions included in the pre-change source code 210 are arranged in the reverse call order.

A first row of the function correspondence table 233 indicates absence of a post-change function corresponding to Func_F_x. Second to sixth rows of the function correspondence table 233 indicate that Func_#_x and Func_#_y correspond to each other. "#" represents A, B, C, D, or E.

A pre-change function at an extremity is Func_F_x.

Referring back to FIG. 2, the description will be continued from step S131.

In step S131, the control unit 120 selects one unselected pre-change function. More specifically, the control unit 120 selects the pre-change functions in order from the pre-change function at the extremity. For example, the control unit 120 selects one pre-change function in the order indicated by the function correspondence table.

In a description of step S132 and step S133, a selected pre-change function refers to the pre-change function selected in step S131.

In step S132, the control unit 120 judges, using the function correspondence table, whether there is any post-change function corresponding to the selected pre-change function.

More specifically, the control unit 120 selects a row containing the name of the selected pre-change function from the function correspondence table 233 and judges whether there is any post-change function name in the selected row. If there is any post-change function name in the selected row, there is a post-change function corresponding to the selected pre-change function.

If the selected pre-change function is Func_B_x, the control unit 120 selects the fifth row from the function correspondence table 233 in FIG. 7. There is a post-change function name (Func_B_y) in the selected fifth row. Thus, the control unit 120 judges that there is any post-change function corresponding to the selected pre-change function.

If the selected pre-change function is Func_F_x, the control unit 120 selects the first row from the function correspondence table 233 in FIG. 7. There is no post-change function name in the selected first row. Thus, the control unit 120 judges that there is no post-change function corresponding to the selected pre-change function.

If there is any post-change function corresponding to the selected pre-change function, the process advances to step S140.

If there is no post-change function corresponding to the selected pre-change function, the process advances to step S133.

In the description below, a combination of a selected pre-change function and a post-change function corresponding to the selected pre-change function will be referred to as a corresponding combination. The functions included in the corresponding combination will also be referred to as target functions.

In step S133, the control unit 120 registers the selected pre-change function as an inequivalent function in an equivalence judgment table.

An inequivalent function refers to a function included in a corresponding combination which is inequivalent, that is, a target function which is inequivalent.

The equivalence judgment table is data for managing the degree of equivalence between target functions and so on.

Figure 8:
FIG. 8 is a chart illustrating an equivalence judgment table 240 according to Embodiment 1.

FIG. 8 illustrates an equivalence judgment table 240.

The equivalence judgment table 240 in FIG. 8 is an equivalence judgment table when Func_F_x is registered as an inequivalent function.

The equivalence judgment table 240 has respective columns for target function, counter-example, degree of equivalence, pre-change source code, and post-change source code.

The column for target function shows target functions. Func_F_x is identified as Func_F.

The column for degree of equivalence shows the degree of equivalence between the target functions.

Diagonal lines in the column for counter-example, the column for pre-change source code, and the column for post-change source code indicate absence of the other target function corresponding to one target function.

The respective columns for counter-example, pre-change source code, and post-change source code will be described later.

Referring back to FIG. 2, step S140 will be described.

In step S140, the equivalence verification apparatus 100 performs full equivalence verification and partial equivalence verification on the corresponding combination.

The full equivalence verification is a process for judging whether the two functions are fully equivalent.

The term "fully equivalent" means that the two functions are equivalent for every input value.

The term "equivalent" means that an output value from one function coincides with an output value from the other function if the same input value is given to the two functions. In other words, the term "equivalent" means that the two pieces of source code coincide in the substance of logical operations, that is, that the same output values are obtained when the pieces of source code are executed with the same input value.

The partial equivalence verification is a process for judging whether the two functions are partially equivalent.

The term "partially equivalent" means that the two functions are equivalent for some input values. In other words, the term "partially equivalent" means that output values always coincide not when the pieces of source code are executed with every input value but when the pieces of source code are executed with each of some input values.

The details of step S140 will be described later.

After step S133 or step S140, the process advances to step S134.

In step S134, the control unit 120 judges whether there is any unselected pre-change function.

If there is any unselected pre-change function, the process advances to step S131.

If there is no unselected pre-change function, the process for the equivalence verification method ends.

A procedure for a verification process (S140) will be described with reference to FIG. 9.

Step S141 and step S142 correspond to the full equivalence verification.

In step S141, the equivalence verification unit 130 generates a verification file.

The verification file is data which serves as an input for equivalence verification.

The equivalence verification is a process for verifying the equivalence between the two functions. That is, the equivalence verification is a process for judging whether the two functions are equivalent.

More specifically, the equivalence verification unit 130 generates an input coincidence statement, call statements, and an output coincidence statement and describes the statements in a file. The file thus obtained is the verification file.

The input coincidence statement is a statement indicating the precondition that an input value to one target function coincides with an input value to the other target function. With the input coincidence statement, the same input value is given to the both target functions.

The call statements are statements for calling and executing the target functions.

The output coincidence statement is a statement indicating the postcondition that an output value from one target function coincides with an output value from the other target function.

FIG. 10 illustrates a verification file 250.

The verification file 250 is a verification file in a case where Func_B_x and Func_B_y are the target functions.

The verification file 250 includes an input coincidence statement 251, two call statements (252 and 253), and an output coincidence statement 254.

The input coincidence statement 251 indicates the precondition that input_x coincides with input_y. input_x is an input value to Func_B_x while input_y is an input value to Func_B_y.

With the call statement 252, Func_B_x is called and executed with input_x as an input value. An output value from Func_B_x is substituted for output_x.

With the call statement 253, Func_B_y is called and executed with input_y as an input value. An output value from Func_B_y is substituted for output.

The output coincidence statement 254 indicates the postcondition that output_x coincides with output_y.

A character string with a double slash indicates a comment.

In step S142, the equivalence verification unit 130 performs the equivalence verification using the verification file.

More specifically, the equivalence verification unit 130 performs the equivalence verification with the verification file, the pre-change source code, and the post-change source code as input. The equivalence verification is a conventional technique.

The equivalence verification executes the pre-change source code and the post-change source code in accordance with a description in the verification file, and the equivalence between the pre-change source code and the post-change source code is verified on the basis of a result of the execution.

For example, the equivalence verification unit 130 performs the equivalence verification by executing a tool called bounded model checking for C/C++ (CBMC).

The equivalence verification unit 130 then registers a result of the equivalence verification in the equivalence judgment table.

Figure 11:
FIG. 11 is a chart illustrating the equivalence judgment table 240 according to Embodiment 1.

FIG. 11 illustrates the equivalence judgment table 240.

The equivalence judgment table 240 in FIG. 11 is an equivalence judgment table immediately before the equivalence verification on Func_B in step S142. Func_B_x and Func_B_y are identified as Func_B.

In the column for target function, Func_E_x and Func_E_y are identified as Func_E, Func_D_x and Func_D_y are identified as Func_D, and Func_C_x and Func_C_y are identified as Func_C.

Since Func_F, Func_E, Func_D, and Func_C are functions subordinate to Func_B in a call relationship, Func_F, Func_E, Func_D, and Func_C are already verified. For this reason, pieces of information on the degrees of equivalence for Func_F, Func_E, Func_D, and Func_C are registered in the equivalence judgment table 240.

Figure 12:
FIG. 12 is a chart illustrating the equivalence judgment table 240 according to Embodiment 1.

FIG. 12 illustrates the equivalence judgment table 240.

The equivalence judgment table 240 in FIG. 12 is an equivalence judgment table in a case where the equivalence verification on Func_B is performed in step S142.

In the equivalence judgment table 240, 0 is registered as a result of the equivalence verification on Func_B in the column for counter-example.

The column for counter-example shows an input value in a case where an output value from one target function does not coincide with an output value from the other target function. Note that both an input value and an output value or an output value alone may be registered in the column for counter-example.

In the column for counter-example, an ellipse indicates an omission of a description, and a hyphen indicates absence of a corresponding value.

Respective fields for degree of equivalence, pre-change source code, and post-change source code for Func_B are still blank. Note that inequivalence may be provisionally registered in the field for degree of equivalence for Func_B.

Referring back to FIG. 9, the description will be continued from step S143.

In step S143, the identifier setting unit 140 sets a branching point identifier (branching point identifiers) for each of the target function in the pre-change source code and the target function in the post-change source code.

A branching point identifier is an identifier for identification of a branching point.

More specifically, the identifier setting unit 140 sets a branching point identifier (branching point identifiers) for each source code of the pre-change source code and the post-change source code in the manner below.

The identifier setting unit 140 first selects a target function from each piece of source code.

The identifier setting unit 140 then finds a branching statement (branching statements) in the target function. A branching statement is a statement for bifurcating a path in accordance with a condition. Concrete branching statements are an if statement and an else statement. The path is a processing route in the piece of source code.

The identifier setting unit 140 then regards each of the beginning of the target function and the branching statement(s) as a branching point and generates a branching point identifier for each branching point.

The identifier setting unit 140 then generates an updating statement for each branching point identifier. The updating statement is a statement which updates a value of the branching point identifier.

The identifier setting unit 140 adds an updating statement to each branching point.

FIG. 13 illustrates the pre-change source code 210.

The pre-change source code 210 in FIG. 13 is the pre-change source code 210 immediately before the execution of step S143 in a case where Func_B_x is a target function.

Updating statements (211 to 214) are added to Func_F_x, Func_E_x, Func_D_x, and Func_C_x that are functions subordinate to Func_B_x in a call relationship.

In the pre-change source code 210, countN_x is a branching point identifier. "N" represents an integer.

FIG. 14 illustrates the pre-change source code 210.

The pre-change source code 210 in FIG. 14 is the pre-change source code 210 immediately after the execution of step S143 in the case where Func_B_x is a target function.

Three updating statements (215 to 217) are added to Func_B_x.

FIG. 15 illustrates the post-change source code 220.

The post-change source code 220 in FIG. 15 is the post-change source code 220 immediately before the execution of step S143 in a case where Func_B_y is a target function.

Updating statements (221 to 223) are added to Func_E_y, Func_D_y, and Func_B_y that are functions subordinate to Func_B_y in a call relationship.

In the post-change source code 220, countN_y is a branching point identifier. "N" character represents an integer.

FIG. 16 illustrates the post-change source code 220.

The post-change source code 220 in FIG. 16 is the post-change source code 220 immediately after the execution of step S143 in the case where Func_B_y is a target function.

Three updating statements (224 to 226) are added to Func_B_y.

Referring back to FIG. 9, the description will be continued from step S144.

In step S144, the identifier setting unit 140 registers, for each callee function in each target function, a branching point identifier in an identifier correspondence table, in association with the callee function.

The callee function is a function to be called. The callee function in the target function is a function to be called by the target function.

The identifier correspondence table is data for managing correspondence relationships between callee functions and branching point identifiers.

More specifically, the identifier setting unit 140 registers a branching point identifier in the manner below.

The identifier setting unit 140 first extracts a call statement from a target function in source code and extracts a function name from the call statement. A function identified by the extracted function name is a callee function.

The identifier setting unit 140 then refers to the source code from the call statement toward the beginning of the target function and extracts a branching point identifier which is first found. The extracted branching point identifier is a branching point identifier corresponding to the callee function.

The identifier setting unit 140 registers the function name of the callee function and the branching point identifier corresponding to the callee function in the identifier correspondence table.

FIG. 17 illustrates an identifier correspondence table 260.

The identifier correspondence table 260 in FIG. 17 is the identifier correspondence table 260 immediately before the execution of step S144 in a case where Func_B_x and Func_B_y are the target functions.

The identifier correspondence table 260 has respective columns for target function, pre-change source code, and post-change source code. Each of the column for pre-change source code and the column for post-change source code includes a column for branching point identifier and a column for callee function.

As illustrated in FIG. 13, a callee function in Func_C_x is Func_F_x. For this reason, Func_F_x is registered in a field for callee function of a field for pre-change source code corresponding to Func_C, as illustrated in FIG. 17.

As illustrated in FIG. 13, a branching point identifier corresponding to Func_F_x is count4_x. For this reason, count4_x is registered in a field for branching point identifier of a field for pre-change source code corresponding to Func_F, as illustrated in FIG. 17.

FIG. 18 illustrates the identifier correspondence table 260.

The identifier correspondence table 260 in FIG. 18 is the identifier correspondence table 260 immediately after the execution of step S144 in the case where Func_B_x and Func_B_y are the target functions.

As illustrated in FIG. 14, callee functions in Func_B_x are Func_D_x and Func_E_x. For this reason, Func_D_x and Func_E_x are registered in a field for callee function of a field for pre-change source code corresponding to Func_B, as illustrated in FIG. 18.

As illustrated in FIG. 14, a branching point identifier corresponding to Func_D_x is count6_x, and a branching point identifier corresponding to Func_E_x is count7_x. For this reason, count6_x is registered in a field for branching point identifier of a field for pre-change source code corresponding to Func_D, as illustrated in FIG. 18. Additionally, count7_x is registered in a field for branching point identifier of a field for pre-change source code corresponding to Func_E.

As illustrated in FIG. 16, callee functions in Func_B_y are Func_D_y and Func_E_y. For this reason, Func_D_y and Func_E_y are registered in a field for callee function of a field for post-change source code corresponding to Func_B, as illustrated in FIG. 18.

As illustrated in FIG. 16, a branching point identifier corresponding to Func_D_y is count5_y, and a branching point identifier corresponding to Func_E_y is count6_y. For this reason, count5_y is registered in a field for branching point identifier of a field for post-change source code corresponding to Func_D, as illustrated in FIG. 18. Additionally, count6_y is registered in a field for branching point identifier of a field for post-change source code corresponding to Func_E.

Referring back to FIG. 9, the description will be continued from step S145.

In step S145, the equivalence verification unit 130 judges whether a result of the equivalence verification in step S142 shows equivalence.

If the result of the equivalence verification shows equivalence, the process advances to step S146.

If the result of the equivalence verification does not show equivalence, the process advances to step S200.

In step S146, the equivalence verification unit 130 registers the target functions as equivalent functions in the equivalence judgment table.

The equivalent functions are functions included in a corresponding combination which is fully equivalent, that is, target functions which are fully equivalent.

In step S200, the equivalence verification apparatus 100 performs the partial equivalence verification on the corresponding combination. That is, the equivalence verification apparatus 100 judges whether the target functions are partially equivalent to each other.

Figure 19:
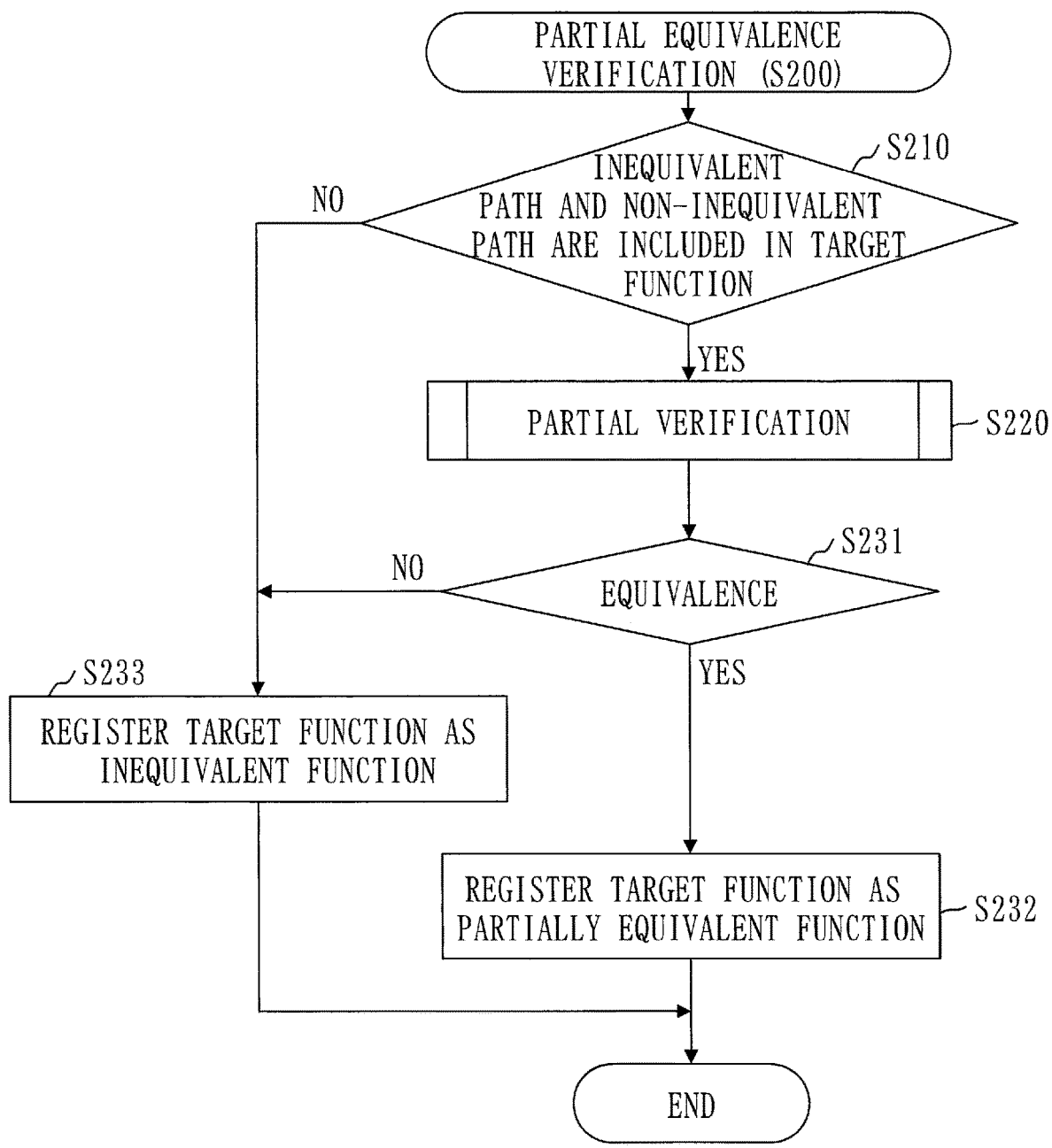
FIG. 19 is a flowchart of partial equivalence verification (S200) according to Embodiment 1.

A procedure for the partial equivalence verification (S200) will be described with reference to FIG. 19.

In step S210, the partial verification judgment unit 150 judges whether an inequivalent path and a non-inequivalent path are both included in each target function.

Note that the target function refers to the pre-change function or the post-change function. That is, it is judged in step S210 whether an inequivalent path and a non-inequivalent path are both included in at least one of the pre-change function and the post-change function.

The inequivalent path is a path in which an inequivalent function is called.

The non-inequivalent path is a path in which a non-inequivalent function is called.

The non-inequivalent function is a function which is not an inequivalent function. Concrete examples of the non-inequivalent function are an equivalent function and a partially equivalent function.

The partially equivalent function is a function included in a corresponding combination which is partially equivalent, that is, a target function which is partially equivalent.

A corresponding combination including a target function, in which an inequivalent path and a non-inequivalent path are both included, is referred to as a partial verification combination.

If an inequivalent path and a non-inequivalent path are both included in one target function, that is, the corresponding combination is a partial verification combination, the process advances to step S220.

If either one of an inequivalent path and a non-inequivalent path is not included in each target function, that is, the corresponding combination is not a partial verification combination, the process advances to step S233.

Figure 20:
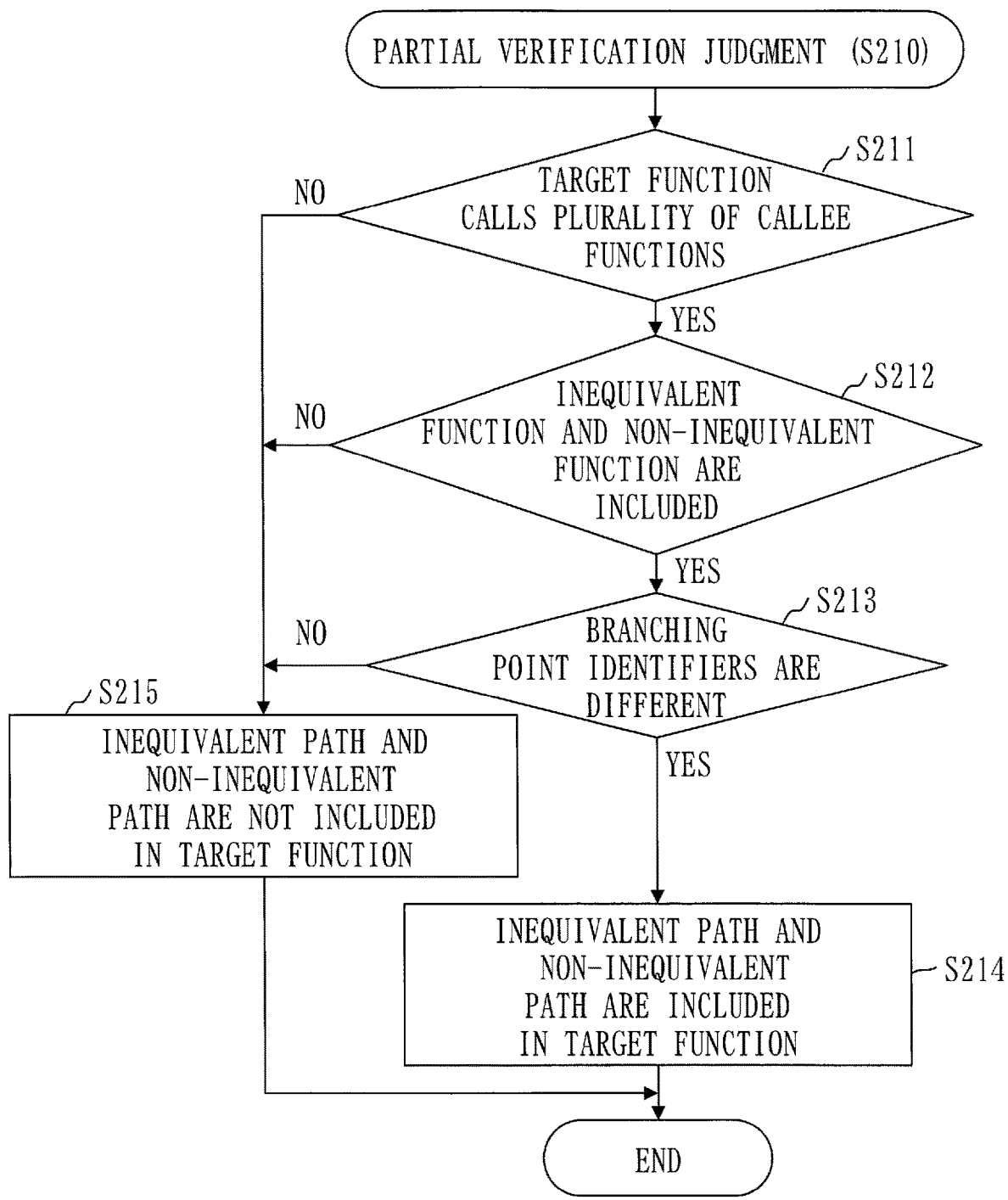
FIG. 20 is a flowchart of partial verification judgment (S210) according to Embodiment 1.

A procedure for partial verification judgment (S210) will be described with reference to FIG. 20.

In step S211, the partial verification judgment unit 150 judges whether a target function is a function which calls a plurality of callee functions.

More specifically, the partial verification judgment unit 150 makes the judgment using the identifier correspondence table 260 in the manner below.

The partial verification judgment unit 150 first refers to the identifier correspondence table 260 and counts the number of callee functions which are associated with the target function.

The partial verification judgment unit 150 then judges whether the number of callee functions associated with the target function is not less than 2.

If the number of callee functions associated with the target function is not less than 2, the target function is a function which calls a plurality of callee functions.

If the target function is a function which calls a plurality of callee functions, the process advances to step S212.

If the target function is not a function which calls a plurality of callee functions, the process advances to step S215.

If the target function is Func_B_x, the number of callee functions (Func_D_x and Func_E_x) associated with the target function is 2 in the identifier correspondence table 260 in FIG. 18.

If the target function is Func_B_y, the number of callee functions (Func_D_y and Func_E_y) associated with the target function is 2 in the identifier correspondence table 260 in FIG. 18.

Thus, if the corresponding combination is a combination of Func_B_x and Func_B_y, the process advances to step S212.

In step S212, the partial verification judgment unit 150 judges whether an inequivalent function and a non-inequivalent function are both included in the plurality of callee functions.

More specifically, the partial verification judgment unit 150 makes the judgment using the identifier correspondence table 260 and the equivalence judgment table 240 in the manner below.

The partial verification judgment unit 150 first refers to the identifier correspondence table 260 and identifies the plurality of callee functions associated with the target function.

The partial verification judgment unit 150 then refers to the equivalence judgment table 240 and identifies a plurality of degrees of equivalence corresponding to the plurality of callee functions.

The partial verification judgment unit 150 judges whether the condition that at least any one of the plurality of degrees of equivalence be inequivalence and the condition that at least any one of the plurality of degrees of equivalence be equivalence or partial equivalence are met.

If at least any one of the plurality of degrees of equivalence is inequivalence, and at least any one of the plurality of degrees of equivalence is equivalence or partial equivalence, an inequivalent function and a non-inequivalent function are both included in the plurality of callee functions.

If an inequivalent function and a non-inequivalent function are both included in the plurality of callee functions, the process advances to step S213.

If one of an inequivalent function and a non-inequivalent function is not included in the plurality of callee functions, the process advances to step S215.

If the target function is Func_B_x, callee functions associated with the target function are Func_D_x and Func_E_x in the identifier correspondence table 260 in FIG. 18. In the equivalence judgment table 240 in FIG. 12, the degree of equivalence for Func_D_x is equivalence, and the degree of equivalence for Func_E_x is inequivalence.

If the target function is Func_B_y, callee functions associated with the target function are Func_D_y and Func_E_y in the identifier correspondence table 260 in FIG. 18. In the equivalence judgment table 240 in FIG. 12, the degree of equivalence for Func_D_y is equivalence, and the degree of equivalence for Func_E_y is inequivalence.

Thus, if the corresponding combination is the combination of Func_B_x and Func_B_y, the process advances to step S213.

In step S213, the partial verification judgment unit 150 judges whether a branching point identifier for an inequivalent function is different from a branching point identifier for a non-inequivalent function.

The branching point identifier for the inequivalent function is a branching point identifier corresponding to a point where the inequivalent function is called.

The branching point identifier for the non-inequivalent function is a branching point identifier corresponding to a point where the non-inequivalent function is called.

More specifically, the partial verification judgment unit 150 makes the judgment using the identifier correspondence table 260 in the manner below.

The partial verification judgment unit 150 first extracts, for each of an inequivalent function (inequivalent functions), a branching point identifier associated with the inequivalent function from the identifier correspondence table 260. The extracted branching point identifier is a branching point identifier for the inequivalent function.

The partial verification judgment unit 150 also extracts, for each of a non-inequivalent function (non-inequivalent functions), a branching point identifier associated with the non-inequivalent function from the identifier correspondence table 260. The extracted branching point identifier is a branching point identifier for the non-inequivalent function.

The partial verification judgment unit 150 compares, for each combination of an inequivalent function and a non-inequivalent function, a branching point identifier for the inequivalent function with a branching point identifier for the non-inequivalent function.

If a branching point identifier for an inequivalent function does not coincide with a branching point identifier for a non-inequivalent function in at least any combination, the branching point identifier corresponding to the inequivalent function is different from a branching point identifier corresponding to the non-inequivalent function.

If a branching point identifier (branching point identifiers) corresponding to an inequivalent function (inequivalent functions) is (are) different from a branching point identifier (branching point identifiers) corresponding to a non-inequivalent function (non-inequivalent functions), the process advances to step S214.

If the branching point identifier(s) corresponding to the inequivalent function(s) coincides (coincide) with a branching point identifier (branching point identifiers) corresponding to the non-inequivalent function(s), the process advances to step S215.

In step S214, the partial verification judgment unit 150 judges that an inequivalent path and a non-inequivalent path are both included in the target function.

In step S215, the partial verification judgment unit 150 judges that one of an inequivalent path and a non-inequivalent path is not included in each target function.

Referring back to FIG. 19, the description will be continued from step S220.

In step S220, the partial verification unit 160 excludes an inequivalent path and performs the equivalence verification on the corresponding combination. That is, the partial verification unit 160 judges whether the target functions are equivalent to each other for a non-inequivalent path.

A procedure for partial verification (S220) will be described with reference to FIG. 21.

In step S221, the partial verification unit 160 adds first exclusion control statements to the verification file.

A first exclusion control statement is a statement for excluding a first inequivalent path.

The first inequivalent path is an inequivalent path in a target function.

An inequivalent function called in the first inequivalent path is referred to as a first inequivalent function.

More specifically, the partial verification unit 160 adds first exclusion control statements in the manner below.

The partial verification unit 160 first generates first exclusion control statements.

A first exclusion control statement is a statement which judges whether a value of a first branching point identifier coincides with a pre-update value (an initial value). If the value of the first branching point identifier does not coincide with the pre-update value, an input which meets a condition for passage through a first inequivalent path is excluded from the equivalence verification.

The first branching point identifier is a branching point identifier for a first inequivalent function, that is, a branching point identifier corresponding to a point where the first inequivalent function is called.

The partial verification unit 160 then selects respective call statements which call the target functions from the verification file.

The partial verification unit 160 adds the respective first exclusion control statements after the selected call statements.

FIG. 22 illustrates the verification file 250 after step S221.

The verification file 250 includes a first exclusion control statement 255 after the call statement 252. The verification file 250 also includes a first exclusion control statement 256 after the call statement 253.

With the first exclusion control statement 255, whether a value of count7_x coincides with a pre-update value is judged. count7_x is a branching point identifier for Func_E_x (see FIG. 18). Func_E_x is a callee function for Func_B_x (see FIG. 18) and is an inequivalent function (see FIG. 12). If a first inequivalent function has been called, the value of count7_x has been updated from 0 to 1. The value of count7_x in this case is outside an equivalence judgment range (see FIG. 22). That is, a result of the judgment by the first exclusion control statement 255 shows incoincidence. For this reason, an input which handles count7_x is excluded from the equivalence verification.

With the first exclusion control statement 256, whether a value of count6_y coincides with a pre-update value is judged. count6_y is a branching point identifier for Func_E_y (see FIG. 18). Func_E_y is a callee function for Func_B_y (see FIG. 18) and is an inequivalent function (see FIG. 12). If a first inequivalent function has been called, the value of count6_y has been updated from 0 to 1. The value of count6_y in this case is outside an equivalence judgment range (see FIG. 22). That is, a result of the judgment by the first exclusion control statement 256 shows incoincidence. For this reason, an input which handles count6_y is excluded from the equivalence verification.

Referring back to FIG. 21, the description will be continued from step S222.

In step S222, the partial verification unit 160 judges whether each target function is a function which calls a partially equivalent function.

That is, the partial verification unit 160 judges whether a partially equivalent function is included in a plurality of callee functions called by the target function.

More specifically, the partial verification unit 160 makes the judgment using the identifier correspondence table 260 and the equivalence judgment table 240 in the manner below.

The partial verification unit 160 first refers to the identifier correspondence table 260 and identifies the plurality of callee functions associated with the target function.

The partial verification unit 160 then refers to the equivalence judgment table 240 and identifies a plurality of degrees of equivalence corresponding to the plurality of callee functions.

The partial verification unit 160 judges whether at least any one of the plurality of degrees of equivalence is partial equivalence.

If at least any one of the plurality of degrees of equivalence is partial equivalence, the target function is a function which calls a partially equivalent function.

If the target function is a function which calls a partially equivalent function, the process advances to step S223.

If the target function is not a function which calls a partially equivalent function, the process advances to step S224.

Callee functions for Func_B_x are Func_D_x and Func_E_x (see FIG. 18). Neither of the degrees of equivalence for Func_D_x and Func_E_x is partial equivalence (see FIG. 12). For this reason, Func_B_x is not a function which calls a partially equivalent function.

Callee functions for Func_B_y are Func_D_y and Func_E_y (see FIG. 18). Neither of the degrees of equivalence for Func_D_y and Func_E_y is partial equivalence (see FIG. 12). For this reason, Func_B_y is not a function which calls a partially equivalent function.

Thus, if the corresponding combination is the combination of Func_B_x and Func_B_y, the process advances to step S224.

In step S223, the partial verification unit 160 adds second exclusion control statements to the verification file.

A second exclusion control statement is a statement for excluding a second inequivalent path.

The second inequivalent path is an inequivalent path in a partially equivalent function called by a target function.

An inequivalent function which is called in the second inequivalent path is referred to as a second inequivalent function.

More specifically, the partial verification unit 160 adds second exclusion control statements in the manner below.

The partial verification unit 160 first generates second exclusion control statements.

A second exclusion control statement is a statement which judges whether a value of a second branching point identifier coincides with a pre-update value (an initial value). If the value of the second branching point identifier does not coincide with the pre-update value, an input which meets a condition for passage through a second inequivalent path is excluded from the equivalence verification.

The second branching point identifier is a branching point identifier for a second inequivalent function, that is, a branching point identifier corresponding to a point where the second inequivalent function is called.

The partial verification unit 160 then selects respective call statements which call partially equivalent functions from the verification file.

The partial verification unit 160 adds the respective second exclusion control statements after the selected call statements.

In step S224, the partial verification unit 160 performs the equivalence verification using the verification file, the pre-change source code, and the post-change source code.

Figure 9:
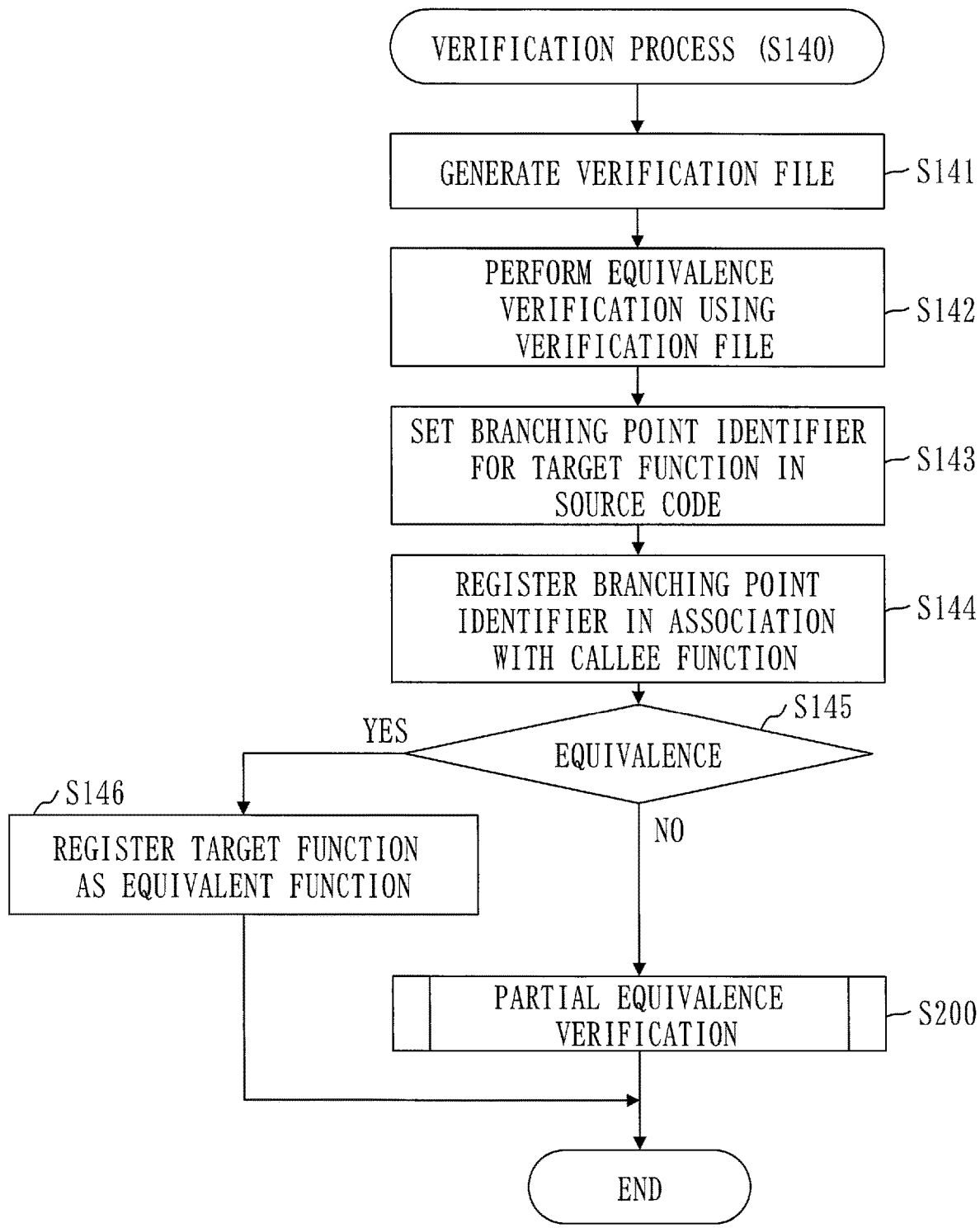
FIG. 9 is a flowchart of a verification process (S140) according to Embodiment 1.

A method for the equivalence verification is the same as that in step S142 of FIG. 9.

Referring back to FIG. 19, the description will be continued from step S231.

In step S231, the partial verification unit 160 judges whether a result of the equivalence verification in step S220 shows equivalence.

If the result of the equivalence verification shows equivalence, the process advances to step S232.

If the result of the equivalence verification does not show equivalence, the process advances to step S233.

In step S232, the partial verification unit 160 registers the target functions as partially equivalent functions in the equivalence judgment table.

Additionally, the partial verification unit 160 registers a branching point identifier for a first inequivalent function and a branching point identifier for a second inequivalent function in the equivalence judgment table.

Figure 23:
FIG. 23 is a chart illustrating the equivalence judgment table 240 (after step S232) according to Embodiment 1.

FIG. 23 illustrates the equivalence judgment table 240.

The equivalence judgment table 240 in FIG. 23 is the equivalence judgment table 240 in a case where Func_B_x and Func_B_y are partially equivalent functions.

Partial equivalence is registered in a field for degree of equivalence corresponding to Func_B.

A column for pre-change source code is a column for a pre-change function which is a target function.

A column for post-change source code is a column for a post-change function which is a target function.

The respective columns for pre-change source code and post-change source code show a branching point identifier for a first inequivalent function and a branching point identifier for a second inequivalent function. A hyphen indicates absence of a first inequivalent function and a second inequivalent function.

A first inequivalent function for Func_B_x is Func_E_x (see FIGS. 18 and 12). The branching point identifier for Func_E_x is count7_x (see FIG. 18). For this reason, count7_x is registered in a field for pre-change source code corresponding to Func_B.

A first inequivalent function for Func_B_y is Func_E_y (see FIGS. 18 and 12). The branching point identifier for Func_E_y is count6_y (see FIG. 18). For this reason, count6_y is registered in a field for post-change source code corresponding to Func_B.

In step S233, the partial verification unit 160 registers the target functions as inequivalent functions in the equivalence judgment table.

A concrete example where step S223 (see FIG. 21) is executed because each target function is a function which calls a partially equivalent function will be described below.

The target functions are Func_A_x and Func_A_y.

FIG. 24 illustrates the pre-change source code 210.

The pre-change source code 210 in FIG. 24 is the pre-change source code 210 immediately after the execution of step S143 (see FIG. 9) in a case where Func_A_x is a target function.

Three updating statements (218, 219 and 2110) are added to Func_A_x.

FIG. 25 illustrates the post-change source code 220.

The post-change source code 220 in FIG. 25 is the post-change source code 220 immediately after the execution of step S143 (see FIG. 9) in a case where Func_A_y is a target function.

Three updating statements (227 to 229) are added to Func_A_y.

FIG. 26 illustrates the identifier correspondence table 260.

The identifier correspondence table 260 in FIG. 26 is the identifier correspondence table 260 immediately after the execution of step S144 (see FIG. 9) in a case where Func_A_x and Func_A_y are the target functions.

As illustrated in FIG. 24, callee functions in Func_A_x are Func_B_x and Func_C_x. For this reason, Func_B_x and Func_C_x are registered in a field for callee function of a field for pre-change source code corresponding to Func_A, as illustrated in FIG. 26.

As illustrated in FIG. 24, a branching point identifier corresponding to Func_B_x is count9_x, and a branching point identifier corresponding to Func_C_x is count10_x. For this reason, count9_x is registered in a field for branching point identifier of a field for pre-change source code corresponding to Func_B, as illustrated in FIG. 26. Additionally, count10_x is registered in a field for branching point identifier of a field for pre-change source code corresponding to Func_C.

As illustrated in FIG. 25, callee functions in Func_A_y are Func_B_y and Func_C_y. For this reason, Func_B_y and Func_C_y are registered in a field for callee function of a field for post-change source code corresponding to Func_A, as illustrated in FIG. 26.

As illustrated in FIG. 25, a branching point identifier corresponding to Func_B_y is count8_y, and a branching point identifier corresponding to Func_C_y is count9_y. For this reason, count8_y is registered in a field for branching point identifier of a field for post-change source code corresponding to Func_B, as illustrated in FIG. 26. Additionally, count9_y is registered in a field for branching point identifier of a field for post-change source code corresponding to Func_C.

Figure 21:
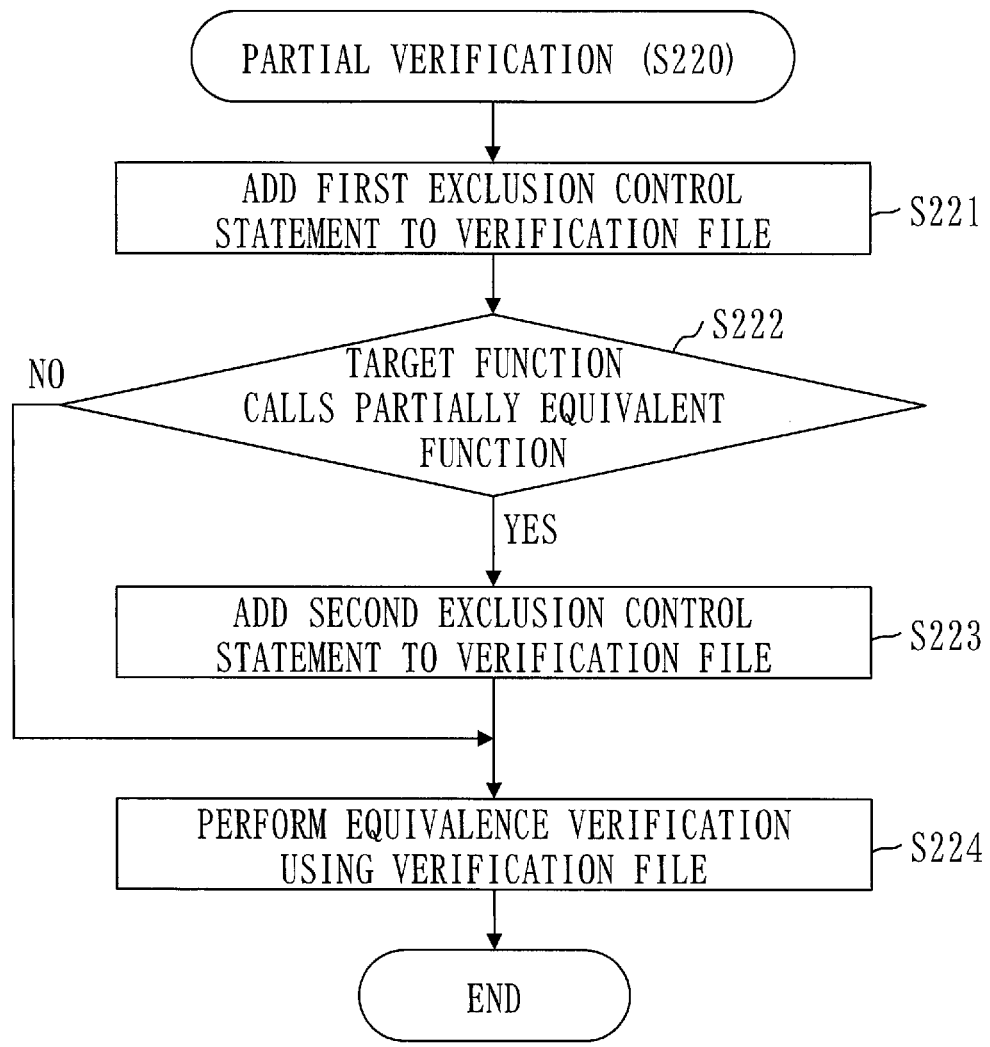
FIG. 21 is a flowchart of partial verification (S220) according to Embodiment 1.

FIG. 27 illustrates the verification file 250 after step S221 (see FIG. 21).

The verification file 250 includes the first exclusion control statement 255 after the call statement 252. Additionally, the verification file 250 includes the first exclusion control statement 256 after the call statement 253.

With the first exclusion control statement 255, whether a value of count10_x coincides with a pre-update value is judged. count10_x is a branching point identifier for Func_C_x (see FIG. 26). Func_C_x is a callee function for Func_A_x (see FIG. 26) and is an inequivalent function (see FIG. 23).

With the first exclusion control statement 256, whether a value of count9_y coincides with a pre-update value is judged. count9_y is a branching point identifier for Func_C_y (see FIG. 26). Func_C_y is a callee function for Func_A_y (see FIG. 26) and is an inequivalent function (see FIG. 23).

In step S222 (see FIG. 21), the partial verification unit 160 judges whether each target function is a function which calls a partially equivalent function.

Callee functions for Func_A_x are Func_B_x and Func_C_x (see FIG. 26). The degree of equivalence for Func_B_x is partial equivalence (see FIG. 23). For this reason, Func_A_x is a function which calls a partially equivalent function.

Callee functions for Func_A_y are Func_B_y and Func_C_y (see FIG. 26). The degree of equivalence for Func_B_y is also partial equivalence (see FIG. 23). For this reason, Func_A_y is a function which calls a partially equivalent function.

Thus, if the corresponding combination is a combination of Func_A_x and Func_A_y, the process advances to step S223.

In step S223 (see FIG. 21), the partial verification unit 160 adds second exclusion control statements to the verification file.

FIG. 28 illustrates the verification file 250 after step S223 (see FIG. 21).

The verification file 250 includes a second exclusion control statement 257 after the call statement 252. The verification file 250 also includes a second exclusion control statement 258 after the call statement 253.

With the second exclusion control statement 257, whether the value of count7_x coincides with the pre-update value is judged. count7_x is the branching point identifier for Func_E_x (see FIG. 26). Func_E_x is a callee function for Func_B_x (see FIG. 26) and is an inequivalent function (see FIG. 23). Func_B_x is a callee function for Func_A_x (see FIG. 26) and is a partially equivalent function (see FIG. 23). If a second inequivalent function has been called, the value of count7_x has been updated from 0 to 1. The value of count7_x in this case is outside an equivalence judgment range (see FIG. 28). That is, a result of the judgment by the second exclusion control statement 257 shows incoincidence. For this reason, an input which handles count7_x is excluded from the equivalence verification.

With the second exclusion control statement 258, whether the value of count6_y coincides with the pre-update value is judged. count6_y is the branching point identifier for Func_B_y (see FIG. 26). Func_E_y is a callee function for Func_B_y (see FIG. 26) and is an inequivalent function (see FIG. 23). Func_B_y is a callee function for Func_A_y (see FIG. 26) and is a partially equivalent function (see FIG. 23). If a second inequivalent function has been called, the value of count6_y has been updated from 0 to 1. The value of count6_y in this case is outside an equivalence judgment range (see FIG. 28). That is, a result of the judgment by the second exclusion control statement 258 shows incoincidence. For this reason, an input which handles count6_y is excluded from the equivalence verification.

Figure 29:
FIG. 29 is a chart illustrating the equivalence judgment table 240 (after step S232) according to Embodiment 1.

FIG. 29 illustrates the equivalence judgment table 240.

The equivalence judgment table 240 in FIG. 29 is the equivalence judgment table 240 in a case where Func_A_x and Func_A_y are partially equivalent functions.

Partial equivalence is registered in a field for degree of equivalence corresponding to Func_A.

A first inequivalent function for Func_A_x is Func_C_x (see FIGS. 26 and 23). The branching point identifier for Func_C_x is count10_x (see FIG. 26). For this reason, count10_x is registered in a field for pre-change source code corresponding to Func_A.

A second inequivalent function for Func_A_x is Func_E_x (see FIGS. 26 and 23). The branching point identifier for Func_E_x is count7_x (see FIG. 26). For this reason, count7_x is registered in the field for pre-change source code corresponding to Func_A.

Similarly, count9_y and count6_y are registered in a field for post-change source code corresponding to Func_A.

\*\*\*Advantageous Effects of Embodiment 1\*\*\*

The equivalence verification apparatus 100 performs equivalence verification in a state where a path through an inequivalent callee function is excluded by using a result regarding the degree of equivalence for a callee function in a target function. This expands a range which is judged as not inequivalent. As a result, a range for analyzing the cause of inequivalence, that is, the cause of a bug narrows, which shortens a manual analysis time.

Embodiment 2

A form for judging whether a call path from a start function to an end function is an inequivalent path will be described with reference to FIGS. 30 to 34 with a main focus on differences from Embodiment 1.

\*\*\*Description of Configuration\*\*\*

Figure 30:
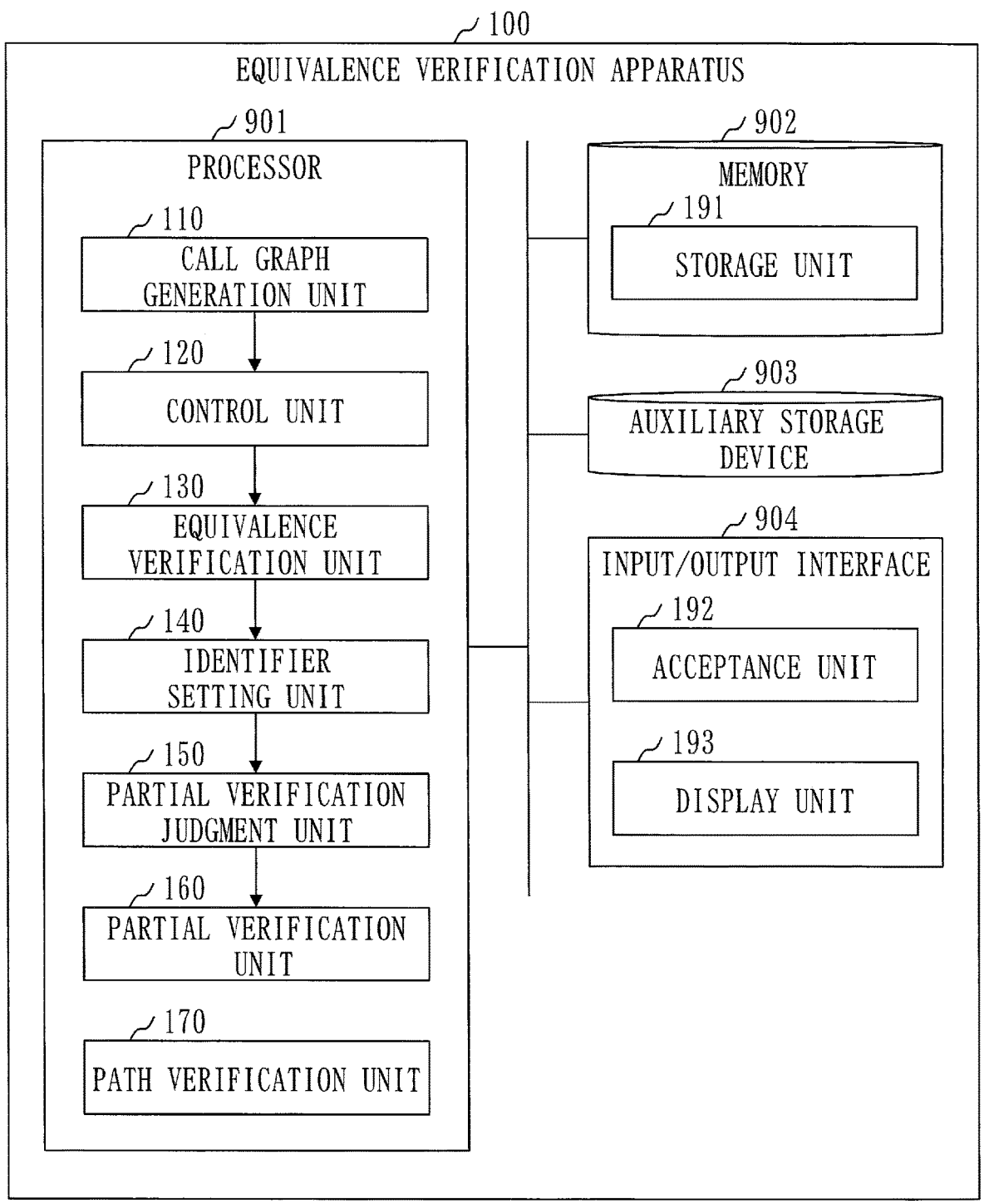
FIG. 30 is a configuration diagram of an equivalence verification apparatus 100 according to Embodiment 2.

A configuration of an equivalence verification apparatus 100 will be described with reference to FIG. 30.

The equivalence verification apparatus 100 includes, as software elements, a path verification unit 170, in addition to a call graph generation unit 110, a control unit 120, an equivalence verification unit 130, an identifier setting unit 140, a partial verification judgment unit 150, and a partial verification unit 160.

An equivalence verification program causes a computer to function as the call graph generation unit 110, the control unit 120, the equivalence verification unit 130, the identifier setting unit 140, the partial verification judgment unit 150, the partial verification unit 160, and the path verification unit 170.

*Description of Operation*

A path verification method will be described with reference to FIG. 31.

The path verification method is performed on one of pre-change source code and post-change source code. The path verification method will be described below using the post-change source code as an object.

In step S301, an acceptance unit 192 accepts a start function identifier and an end function identifier (end function identifiers).

The start function identifier is an identifier for a function which is designated as a start function.

The end function identifier is an identifier for a function which is designated as an end function.

A path from the start function to the end function is referred to as a call path.

The call path indicates a function call order from the start function to the end function.

For example, the start function identifier and the end function identifier(s) are accepted by the procedure below.

The path verification unit 170 first generates a call graph chart by executing Graphviz with a post-change call graph 232 as input.

Graphviz is a tool for generating a call graph chart.

A call graph chart is a chart representing a call relationship indicated by a call graph.

A display unit 193 then displays the call graph chart on a display.

A verifier then refers to the call, graph chart, determines the start function and the end function(s), and inputs the start function identifier and the end function identifier(s) to the equivalence verification apparatus 100. If inputting of the end function identifier(s) is omitted, an identifier for a function at an extremity is assumed to be input as each end function identifier.

The acceptance unit 192 accepts the input start function identifier and end function identifier(s).

Figure 32:
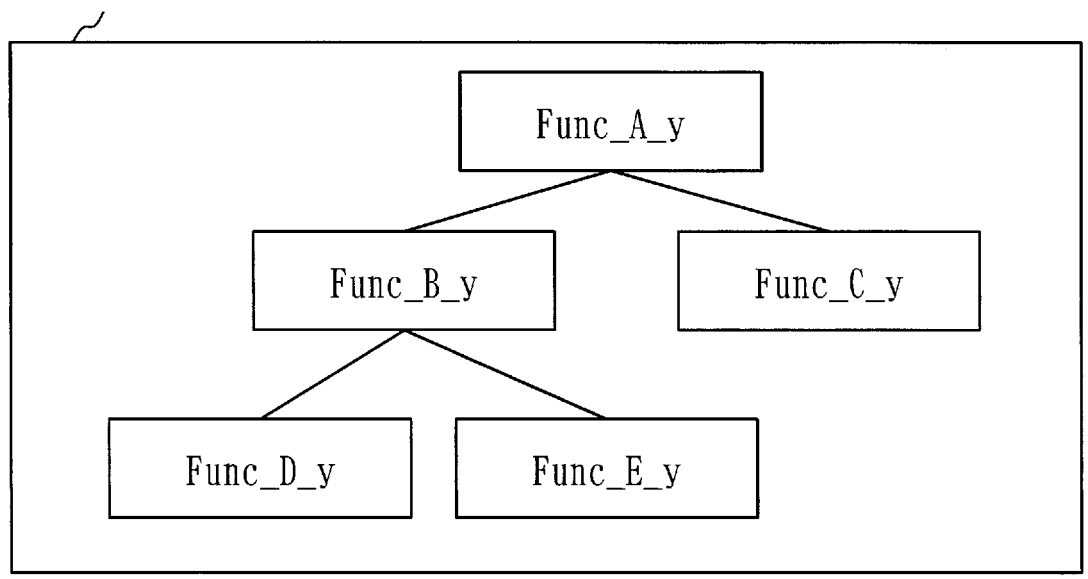
FIG. 32 is a chart illustrating a call graph chart 270 according to Embodiment 2.

FIG. 32 illustrates a call graph chart 270.

The call graph chart 270 is a call graph chart corresponding to the post-change call graph 232 in FIG. 6.

Referring back to FIG. 31, the description will be continued from step S310.

In step S310, the path verification unit 170 extracts a third branching point identifier for each call path.

The third branching point identifier is a branching point identifier for a callee function included in the call path. The branching point identifier for the callee function is a branching point identifier corresponding to a point where the callee function is called.

Figure 33:
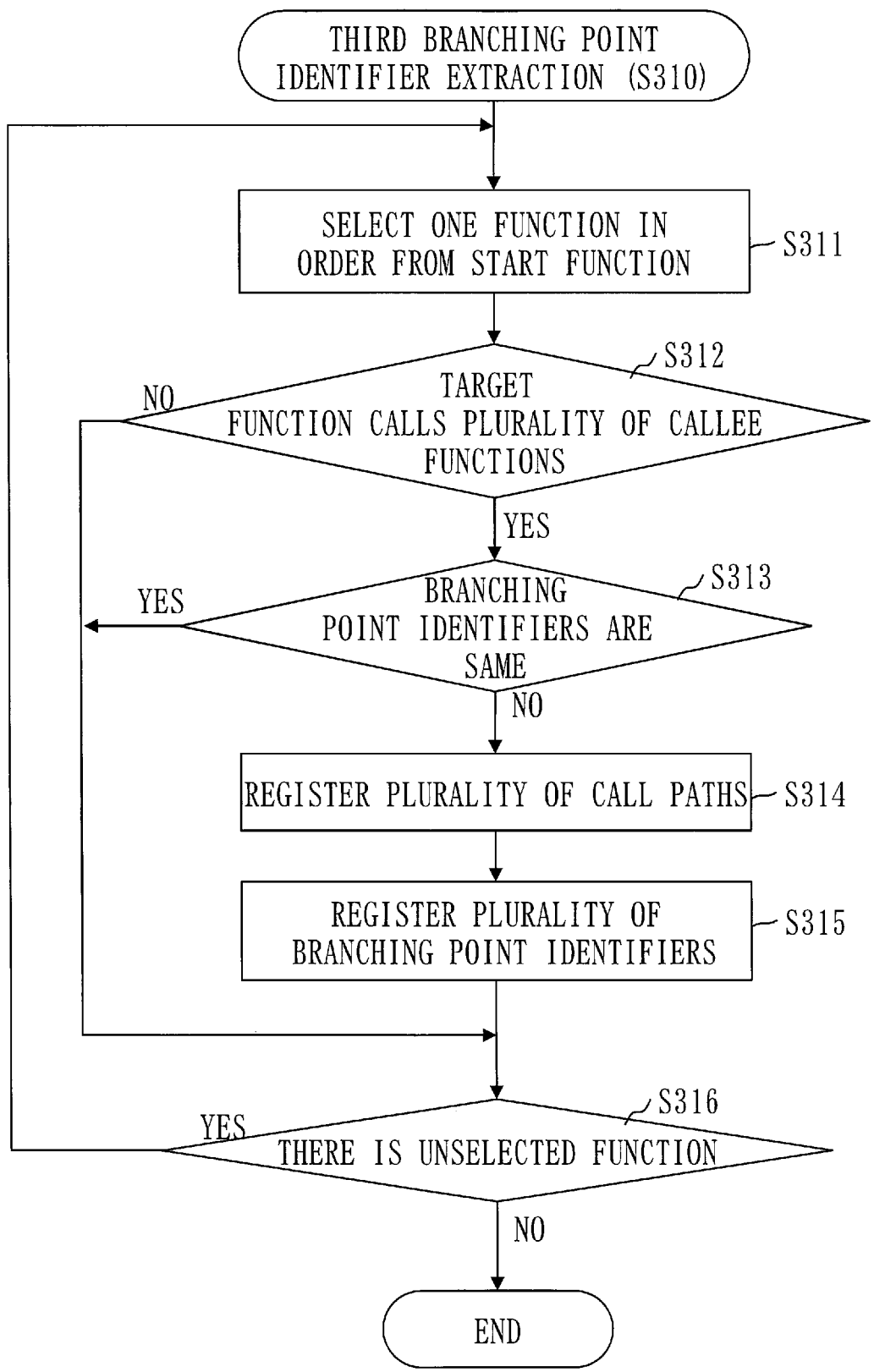
FIG. 33 is a flowchart of third branching point identifier extraction (S310) according to Embodiment 2.

Third branching point identifier extraction (S310) will be described with reference to FIG. 33.

In step S311, the path verification unit 170 selects one function in order from the start function.

In a description of steps S312 to S315, a target function refers to the function selected in step S311.

In step S312, the path verification unit 170 judges whether the target function is a function which calls a plurality of callee functions.

More specifically, the path verification unit 170 makes the judgment using an identifier correspondence table 260 in the manner below.

The path verification unit 170 first refers to the identifier correspondence table 260 and counts the number of callee functions which are associated with the target function.

The path verification unit 170 then judges whether the number of callee functions associated with the target function is not less than 2.

If the number of callee functions associated with the target function is not less than 2, the target function is a function which calls a plurality of callee functions.

If the target function is a function which calls a plurality of callee functions, the process advances to step S313.

If the target function is not a function which calls a plurality of callee functions, the process advances to step S316.

In the identifier correspondence table 260 in FIG. 26, callee functions corresponding to Func_A_y are two functions, Func_B_y and Func_C_y.

Thus, if the target function is Func_A_y, the process advances to step S313.

In step S313, the path verification unit 170 judges whether a plurality of third branching point identifiers corresponding to the plurality of callee functions are all the same.

More specifically, the path verification unit 170 makes the judgment using the identifier correspondence table 260 in the manner below.

The path verification unit 170 first extracts, for each callee function, a branching point identifier corresponding to the callee function from the identifier correspondence table 260.

The path verification unit 170 then judges whether all the extracted branching point identifiers are the same.

If the plurality of branching point identifiers corresponding to the plurality of callee functions are all the same, the process advances to step S316.

If at least any one of the plurality of branching point identifiers corresponding to the plurality of callee functions is different from the other branching point identifiers, the process advances to step S314.

In the identifier correspondence table 260 in FIG. 26, a branching point identifier for Func_B_y is count8_y, and a branching point identifier for Func_C_y is count9_y.

Thus, if the plurality of callee functions are Func_B_y and Func_C_y, the process advances to step S314.

In step S314, the path verification unit 170 registers a plurality of call paths in a path judgment table.

The path judgment table is data for managing the degree of equivalence and a third branching point identifier for each call path.

More specifically, the path verification unit 170 registers the plurality of call paths in the manner below.

The path verification unit 170 judges whether a call path including the target function is registered in the path judgment table.

If a call path including the target function is registered in the path judgment table, the path verification unit 170 registers call paths, equal in number to the plurality of callee functions, in the path judgment table by copying the call path including the target function. The path verification unit 170 registers a different callee function for each call path.

If no call path including the target function is registered in the path judgment table, the path verification unit 170 registers, for each callee function, a call path indicating the target function and the callee function in the path judgment table. The path verification unit 170 registers a different callee function for each call path.

In step S315, the path verification unit 170 registers a plurality of branching point identifiers in the path judgment table. Each of the plurality of branching point identifiers to be registered is a third branching point identifier.

More specifically, the path verification unit 170 extracts, for each call path registered in step S314, a branching point identifier for the callee function from the identifier correspondence table 260 and registers the extracted branching point identifier in the path judgment table.

In step S316, the path verification unit 170 judges whether there is any unselected function.

If there is any unselected function, the process advances to step S311.

If there is no unselected function, the third branching point identifier extraction (S310) ends.

FIG. 34 illustrates a path judgment table 280.

Figure 31:
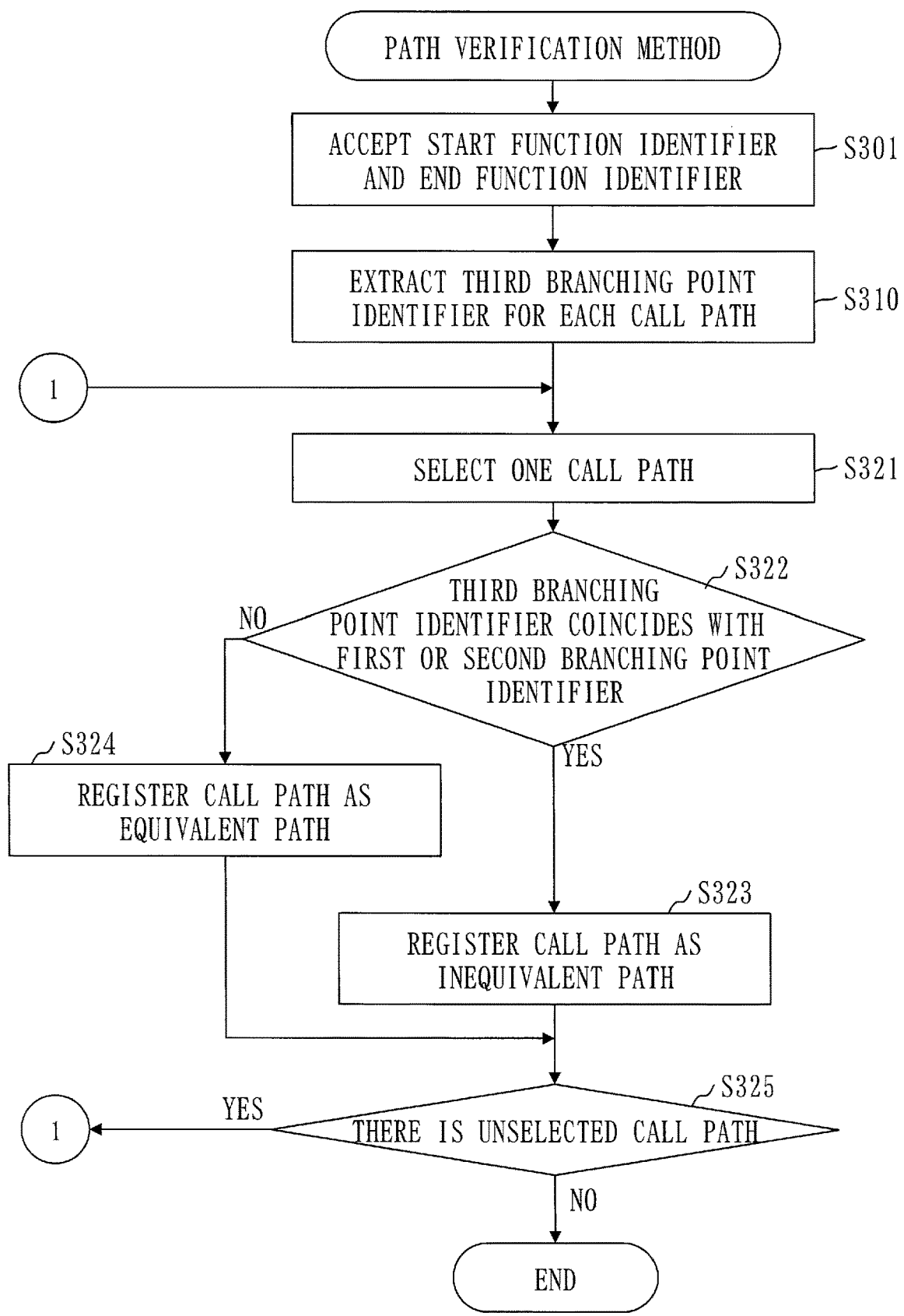
FIG. 31 is a flowchart of a path verification method according to Embodiment 2.

The path judgment table 280 in FIG. 34 is a path judgment table corresponding to the call graph chart 270 in FIG. 32 and is a path judgment table after step S310 (see FIG. 31).

A start function is Func_A_y, and end functions are Func_C_y, Func_D_y, and Func_E_Y.

Callee functions in a call path No. 1 are Func_B_y and Func_D_y. A branching point identifier for Func_B_y is count8_y, and a branching point identifier for Func_D_y is count5_y (see FIG. 26). Thus, third branching point identifiers for the call path No. 1 are count8_y and count5_y.

Callee functions in a call path No. 2 are Func_B_y and Func_E_y. The branching point identifier for Func_B_y is count8_y, and a branching point identifier for Func_E_y is count6_y (see FIG. 26). Thus, third branching point identifiers for the call path No. 2 are count8_y and count6_y.

A callee function in a call path No. 3 is Func_C_y. A branching point identifier for Func_C_y is count9_y (see FIG. 26). Thus, a third branching point identifier for the call path No. 3 is count9_y.

Referring back to FIG. 31, the description will be continued from step S321.

In step S321, the path verification unit 170 selects one unselected call path.

In a description of steps S322 to S324, a call path refers to the call path selected in step S321.

In step S322, the path verification unit 170 judges whether at least any third branching point identifier for the call path coincides with either one of a first branching point identifier for the start function and a second branching point identifier for the start function.

More specifically, the path verification unit 170 makes the judgment in the manner below.

The path verification unit 170 first extracts a third branching point identifier (third branching point identifiers) for the call path from a column for branching point identifier in the path judgment table 280.

The path verification unit 170 then extracts the first branching point identifier for the start function and the second branching point identifier for the start function from a column for post-change source code in the equivalence judgment table 240.

The path verification unit 170 then compares, for each third branching point identifier for the call path, the third branching point identifier with each of the first branching point identifier for the start function and the second branching point identifier for the start function.

The path verification unit 170 judges, on the basis of a result of the comparison, whether at least any one of the third branching point identifier(s) for the call path coincides with either one of the first branching point identifier for the start function and the second branching point identifier for the start function.

If at least any one of the third branching point identifier(s) for the call path coincides with either one of the first branching point identifier for the start function and the second branching point identifier for the start function, the process advances to step S323.

If no third branching point identifier for the call path coincides with the first branching point identifier for the start function and the second branching point identifier for the start function, the process advances to step S324.

In the path judgment table 280 in FIG. 34, third branching point identifiers for the call path No. 1 are count8_y and count5_y.

A first branching point identifier and a second branching point identifier for Func_A_y that is the start function are count6_y and count9_y (see FIG. 29).

In this case, no third branching point identifier coincides with the first branching point identifier and the second branching point identifier, the process advances to step S324.

In the path judgment table 280 in FIG. 34, third branching point identifiers for the call path No. 2 are count8_y and count6_y.

The first branching point identifier and the second branching point identifier for Func_A_y that is the start function are count6_y and count9_y (see FIG. 29).

Since the third branching point identifiers and the first branching point identifier share count6_y in this case, the process advances to step S323.

In the path judgment table 280 in FIG. 34, the third branching point identifier for the call path No. 3 is count9_y.

The first branching point identifier and the second branching point identifier for Func_A_y that is the start function are count6_y and count9_y (see FIG. 29).

Since the third branching point identifier and the second branching point identifier share count9_y in this case, the process advances to step S323.

In step S323, the path verification unit 170 registers the call path as an inequivalent path in the path judgment table.

In step S324, the path verification unit 170 registers the call path as an equivalent path in the path judgment table.

In step S325, the path verification unit 170 judges whether there is any unselected call path.

If there is any unselected call path, the process advances to step S321.

If there is no unselected call path, the process for the path verification method ends.

Figure 35:
FIG. 35 is a chart illustrating the path judgment table 280 (after path verification) according to Embodiment 2.

FIG. 35 illustrates the path judgment table 280 obtained by the path verification method.

In the path judgment table 280, the call path No. 1 is an equivalent path in which no inequivalent function is called. The call path No. 2 and the call path No. 3 are inequivalent paths, in each of which an inequivalent function is called.

\*\*\*Advantageous Effects of Embodiment 2\*\*\*

The degree of equivalence for a call path can be verified using a result of Embodiment 1. This expands a range for a path (an equivalent path) which is judged as not inequivalent. As a result, for example, generation of a functional test case and designation of an expected output value can be omitted for an equivalent path, which reduces man-hours required for verification.

*Supplement to Embodiments*

In each embodiment, functions of the equivalence verification apparatus 100 may be implemented by hardware.

Figure 36:
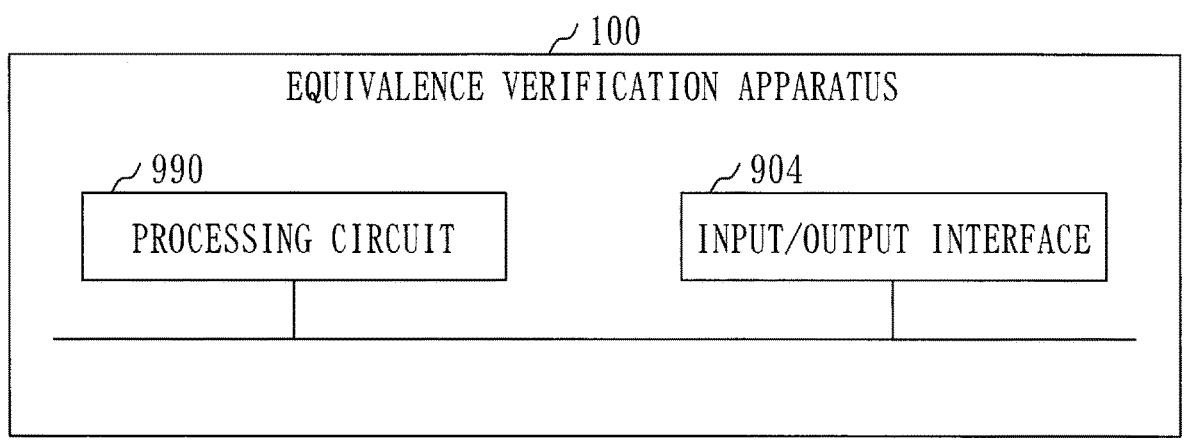
FIG. 36 is a hardware configuration diagram of the equivalence verification apparatus 100 according to each embodiment.

FIG. 36 illustrates a configuration in a case where the functions of the equivalence verification apparatus 100 are implemented by hardware.

The equivalence verification apparatus 100 includes a processing circuit 990. The processing circuit 990 is also referred to as processing circuitry.

The processing circuit 990 is a dedicated electronic circuit which implements the call graph generation unit 110, the control unit 120, the equivalence verification unit 130, the identifier setting unit 140, the partial verification judgment unit 150, the partial verification unit 160, the path verification unit 170, and the storage unit 191.

For example, the processing circuit 990 is a single circuit, a composite circuit, a programmed processor, a parallel-programmed processor, a logic IC, a GA, an ASIC, an FPGA, or a combination thereof. GA stands for Gate Array, ASIC stands for Application Specific Integrated Circuit, and FPGA stands for Field Programmable Gate Array.

The equivalence verification apparatus 100 may include a plurality of processing circuits which replace the processing circuit 990. The plurality of processing circuits share roles of the processing circuit 990.

The embodiments are illustrative of preferred forms and are not intended to limit the technical scope of the present invention. Each embodiment may be partially practiced or may be practiced in combination with another form. Each procedure described using a flowchart and the like may be appropriately changed.

REFERENCE SIGNS LIST

100: equivalence verification apparatus; 110: call graph generation unit; 120: control unit; 130: equivalence verification unit; 140: identifier setting unit; 150: partial verification judgment unit; 160: partial verification unit; 170: path verification unit; 191: storage unit; 192: acceptance unit; 193: display unit; 210: pre-change source code; 211 to 219: updating statement; 2110: updating statement; 220: post-change source code; 221 to 229: updating statement; 231: pre-change call graph; 232: post-change call graph; 233: function correspondence table; 240: equivalence judgment table; 250: verification file; 251: input coincidence statement; 252: call statement; 253: call statement; 254: output coincidence statement; 255: first exclusion control statement; 256: first exclusion control statement; 257: second exclusion control statement; 258: second exclusion control statement; 260: identifier correspondence table; 270: call graph chart; 280: path judgment table; 901: processor; 902: memory; 903: auxiliary storage device; 904: input/output interface; 990: processing circuit

The invention claimed is:

1. An equivalence verification apparatus to determine the equivalence between pre-change source code and post-change source code, the apparatus comprising:
    processing circuitry configured to
        acquire a function correspondence table indicating a correspondence relationship between pre-change functions and post-change functions, where each corresponding combination in the function correspondence table associates a pre-change function included in pre-change source code with a post-change function included in post-change source code, if any;
    judge through equivalence verification, for each of the corresponding function combinations in the acquired function correspondence table whether the associated functions are equivalent to each other;
    judge, for each of the corresponding function combinations judged to be inequivalent, whether the corresponding combination is a partial verification combination including a function where an inequivalent path, in which an inequivalent function is called, and a non-inequivalent path, in which an equivalent function and/or partially equivalent function is called, are both included; and
    judge, for each of the corresponding function combinations judged to be partial verification combinations, whether the functions included in the partial verification combination are partially equivalent to each other by excluding the inequivalent path and performing the equivalence verification.

2. The equivalence verification apparatus according to claim 1, wherein the processing circuitry
    generates, for each of the pre-change source code and the post-change source code, a branching point identifier at each of branching points in the source code, and
    judges that the corresponding combination is the partial verification combination if a branching point identifier corresponding to a point where the inequivalent function is called and a branching point identifier corresponding to a point where a function which is not the inequivalent function is called do not coincide with each other in at least one of the pre-change source code and the post-change source code.

3. The equivalence verification apparatus according to claim 1, wherein the processing circuitry
    generates a verification file which serves as input for the equivalence verification and performs the equivalence verification using the verification file, and
    adds a first exclusion control statement for excluding a first inequivalent path which is the inequivalent path in the function included in the corresponding combination to the verification file and performs the equivalence verification using the verification file after the first exclusion control statement is added.

4. The equivalence verification apparatus according to claim 3, wherein the processing circuitry
    adds, for each of the pre-change source code and the post-change source code, an updating statement which updates a value of a branching point identifier to each of branching points in the source code,
    generates, as the verification file, a file including a call statement which calls the functions included in the corresponding combination, and
    adds, as the first exclusion control statement, a statement which judges whether a value of a branching point identifier corresponding to a point where the inequivalent function is called coincides with a pre-update value after the call statement and performs the equivalence verification using the pre-change source code after the updating statements are added, the post-change source code after the updating statements are added, and the verification file after the first exclusion control statement is added.

5. The equivalence verification apparatus according to claim 1, wherein the processing circuitry generates a verification file which serves as input for the equivalence verification and performs the equivalence verification using the verification file, and adds a first exclusion control statement for excluding a first inequivalent path which is the inequivalent path in the function included in the corresponding combination to the verification file, if the corresponding combination is the partial verification combination, and the function included in the partial verification combination is a function which calls a partially equivalent function, adds a second exclusion control statement for excluding a second inequivalent path which is an inequivalent path in the partially equivalent function to the verification file and, performs the equivalence verification using the verification file.

6. The equivalence verification apparatus according to claim 5, wherein the processing circuitry adds, for each of the pre-change source code and the post-change source code, an updating statement which updates a value of a branching point identifier to each of branching points in the source code, generates, as the verification file, a file including a call statement which calls the functions included in the corresponding combination, and adds, as the first exclusion control statement, a statement, which judges whether a value of a first branching point identifier corresponding to a point where a first inequivalent function which is an inequivalent function called in the first inequivalent path is called coincides with a pre-update value, after the call statement, adds, as the second exclusion control statement, a statement, which judges whether a value of a second branching point identifier corresponding to a point where a second inequivalent function which is an inequivalent function called in the second inequivalent path is called coincides with a pre-update value, after the call statement, and performs the equivalence verification using the pre-change source code, the post-change source code, and the verification file.

7. The equivalence verification apparatus according to claim 6, comprising:

an input/output interface to accept a start function identifier and an end function identifier, wherein the processing circuitry judges whether a call path from a start function identified by the start function identifier to an end function identified by the end function identifier is an inequivalent path.

8. The equivalence verification apparatus according to claim 7, wherein the processing circuitry extracts, for each of callee functions included in the call path, a third branching point identifier which is a branching point identifier corresponding to a point where the callee function is called, judges whether at least any one of the third branching point identifiers coincides with either one of the first branching point identifier for the start function and the second branching point identifier for the start function, and, if the at least any one third branching point identifier coincides with either one of the first branching point identifier for the start function and the second branching point identifier for the start function, judges that the call path is an inequivalent path.

9. A non-transitory computer readable medium storing an equivalence verification program that causes a computer to execute processes of:

acquiring a function correspondence table indicating a correspondence relationship between pre-change functions and post-change functions, where each corresponding combination in the function correspondence table associates a pre-change function included in pre-change source code with a post-change function included in post-change source code, if any;

judging through equivalence verification, for each of the corresponding function combinations in the acquired correspondence table, whether the associated functions are equivalent to each other;

judging, for each of the corresponding function combinations judged to be inequivalent, whether the corresponding combination is a partial verification combination including a function where an inequivalent path, in which an inequivalent function is called, and a non-inequivalent path, in which an equivalent function and/or partially equivalent function is called, are both included; and judging, for each of the corresponding function combinations judged to be partial verification combinations, whether the functions included in the partial verification combination are partially equivalent to each other by excluding the inequivalent path and performing the equivalence verification.

* * * * *